US010868609B1

(12) United States Patent
Kossin et al.

(10) Patent No.: US 10,868,609 B1
(45) Date of Patent: Dec. 15, 2020

(54) DIVERSITY POLARIZATION MODULATION

(71) Applicant: Eagle Technology, LLC, Melbourne, FL (US)

(72) Inventors: Philip Kossin, Clifton, NJ (US); Brett Pigon, Grant Valkaria, FL (US)

(73) Assignee: Eagle Technology, LLC, Melbourne, FL (US)

( * ) Notice: Subject to any disclaimer, the term of this patent is extended or adjusted under 35 U.S.C. 154(b) by 314 days.

(21) Appl. No.: 15/993,246

(22) Filed: May 30, 2018

(51) Int. Cl.
*H04B 7/10* (2017.01)
*H04B 1/69* (2011.01)
*H01Q 15/24* (2006.01)
*H01Q 21/24* (2006.01)

(52) U.S. Cl.
CPC ............. *H04B 7/10* (2013.01); *H01Q 15/244* (2013.01); *H01Q 21/245* (2013.01); *H04B 1/69* (2013.01); *H04B 2001/6904* (2013.01)

(58) Field of Classification Search
CPC ...... H04B 7/10; H04B 14/008; H01Q 21/245; H01Q 21/24; H01Q 25/001
USPC .......................................................... 342/361
See application file for complete search history.

(56) References Cited

U.S. PATENT DOCUMENTS

| | | | | |
|---|---|---|---|---|
| 6,175,327 B1* | 1/2001 | Lin | ...................... | H01Q 3/2611 342/357.64 |
| 7,248,841 B2* | 7/2007 | Agee | ................... | H04B 7/0417 455/101 |
| 7,512,237 B1* | 3/2009 | Schantz | .................... | H04L 9/12 359/107 |
| 9,142,873 B1* | 9/2015 | Bharghavan | .......... | H01Q 1/084 |
| 9,762,296 B2* | 9/2017 | Takei | ................. | H04L 27/0002 |
| 2002/0181439 A1* | 12/2002 | Orihashi | ................. | H04K 1/02 370/350 |
| 2007/0047678 A1* | 3/2007 | Sibecas | ................... | H04L 5/023 375/343 |
| 2008/0218424 A1* | 9/2008 | Blanton | .............. | H01Q 21/245 343/756 |
| 2009/0103720 A1* | 4/2009 | Karayil Thekkoott Narayanan .... | | H04W 52/04 380/34 |

OTHER PUBLICATIONS

Abidin, Z. u., et al., "Circular Polarization Modulation for Digital Communication Systems," 2012 8th International Symposium on Communication Systems, Networks & Digital Signal Processing (CSNDSP), Poznan, pp. 1-6 (2012).

(Continued)

*Primary Examiner* — Harry K Liu
(74) *Attorney, Agent, or Firm* — Edell, Shapiro & Finnan, LLC

(57) ABSTRACT

A method includes transmitting a digital code from a transmitter to a receiver. Information is transmitted via electromagnetic waves from the transmitter to the receiver. The transmission of the information includes transmitting a first portion of the information using electromagnetic waves with a first polarization in response to a first value of the digital code, and transmitting a second portion of the information using electromagnetic waves of a second polarization in response to a second value of the digital code. The first information may include a first navigational code and the second information may include a second navigational code.

18 Claims, 16 Drawing Sheets

(56) References Cited

OTHER PUBLICATIONS

Brenneman, M., et al., "Mitigation of GPS Multipath Using Polarization and Spatial Diversities," ION GNSS 20th International Technical Meeting of the Satellite Division, Fort Worth Texas, pp. 1221-1229 (Sep. 25-28, 2007).
Colburn, J.S., et al., "Evaluation of Personal Communications Dual-Antenna Handset Diversity Performance," IEEE Transactions on Vehicular Technology, vol. 47(3): 737-746 (1998).
Dehghanian, V., et al., "Dual-Polarized Synthetic Antenna Array for GNSS Handheld Applications," ISRN Communications and Networking, vol. 2013, Article ID 985401, pp. 1-11 (2013).
Groves, P.D., et al., "Novel Multipath Mitigation Methods using a Dual-polarization Antenna," Proceedings of the 23rd International Technical Meeting of the Satellite Division of the Institute of Navigation (ION GNSS 2010), pp. 140-151 (2010).
He, Y. et al., "A Wideband Circularly Polarized Cross-Dipole Antenna," IEEE Antennas and Wireless Propagation Letters, vol. 13:67-70 (2014).
Lockard, M.D., et al., "Analysis of a Polarization Agile Communication System," 2015 IEEE Aerospace Conference, Big Sky, MT, pp. 1-7 (2015).
McMilin, E, et al., "GPS Anti-Jam: A Simple Method of Single Antenna Null-Steering for Aerial Applications," Proceedings of the ION 2015 Pacific PNT Meeting, Honolulu, Hawaii, pp. 470-483 (Apr. 2015).
McMilin, E, et al., "Single Antenna, Dual Use," Inside CNSS, pp. 40-53 (Sep.-Oct. 2015).
Nagasaka, M., et al., "Dual-Circularly Polarized Parabolic Reflector Antenna with Microstrip Antenna Array for 12-GHz Band Satellite Broadcasting Reception," 2016 International Symposium on Antennas and Propagation (ISAP), Okinawa, pp. 692-693 (2016).
Roberts, K., et al., "Performance of Dual-Polarization QPSK for Optical Transport Systems," Journal of Lightwave Technology, vol. 27(16): 3546-3559 (Aug. 2009).
Sgammini, M., et al., "Double Take: Mitigating Interference with a Dual-Polarized Antenna Array in a Real Environment," GPS World, pp. 66-72 (Feb. 2017).

Sgammini, M., et al., "Innovation: Mitigating Interference with a Dual-polarized Antenna Array in a Real Environment," GPS World, 12 pages (Feb. 2017).
Shuangxun, L., et al., "GPS Anti-Jamming Utilizing Dual-Polarized Antenna," 2011 Cross Strait Quad-Regional Radio Science and Wireless Technology Conference (CSQRWC), pp. 502-506 (Jul. 2011).
Szalay, Z.A., and L. Nagy, "Indoor Positioning Using Linearly and Circularly Polarized Antennas," Periodica Polytechnica Electrical Engineering and Computer Science, vol. 60(1):60-64 (2016).
Wendler, F. et al., "Dual-Polarization Time Delay Estimation for Multipath Mitigation," Proceedings of the 19th International ITG Workshop on Smart Antennas (WSA 2015), Ilmenau, pp. 1-6 (Mar. 2015).
Wong, K.T., et al., "Fast-Polarization-Hopping Transmission Diversity to Mitigate Prolonged Deep Fades in Indoor Wireless Communications," IEEE Antennas and Propagation Magazine, vol. 48(3): 20-27 (Jun. 2006).
Xie, L., et al., "Mitigating Multipath Bias Using a Dual-Polarization Antenna: Theoretical Performance, Algorithm Design, and Simulation," Sensors, vol. 17(2): 1-23 (2017).
Zaheri, M., "Enhanced GNSS Signal Detection Performance Utilizing Polarization Diversity," MSc Thesis, published as Report No. 20322, Department of Geomatics Engineering, The University of Calgary, Canada, pp. 1-142 (2011).
Zhang, M., et al., "GPS Signal Anti-jamming Based on Dual-polarized Antenna Array," 2011 IEEE International Conference on Signal Processing, Communications and Computing (ICSPCC), pp. 1-4 (Sep. 2011).
ANTCOM Corp., Antenna Catalog Product, Dual Polarization (RHCP/LHCP) L1/L2GPS Antenna; P/N: 1.9G1215RL-PP-XRS-X 1.9" Square Configurations with Back Mounting Option, Amplifiers/ Power Divider/Combiner/Filters :http://www.antcom.com/documents/catalogs/PeripheralAntennaProducts1.pdf (2016).
ANTCOM Corp., Antenna Catalog Product, Dual Polarization (RHCP/LHCP) L1/L2GPS Antenna; P/N: 3G1215RL-PP-XS-X RevA (Old P/N: 3G1215PJ2-XS-1) 3.5" Diameter Configurations with Front/Back Mounting Option, Antenna Mounts: http://www.antcom.com/documents/catalogs/PeripheralAntennaProducts2.pdf (2016).

\* cited by examiner

| X | Y | | | X AND Y DIPOLE RADIATION | POLARIZATION | CASE |
|---|---|---|---|---|---|---|
| ↗ | ↗ | Y = X | LINEAR POLARIZATION (Y DIPOLE / X DIPOLE) | LINEAR, Y = X | 1 |
| ↗ | ↘ | Y = -X | LINEAR POLARIZATION (Y DIPOLE / X DIPOLE) | LINEAR, Y = -X | 2 |
| ↗ | ↗ | Y = jX | CURRENT IN Y DIPOLE LEADS X DIPOLE BY 90 DEGREES | LHCP | 3 |
| ↗ | ↗ | Y = -jX | CURRENT IN Y DIPOLE LAGS X DIPOLE BY 90 DEGREES | RHCP | 4 |

FIG. 4

| ENCODING RULE Y = KX | POLARIZATION | CASE |
|---|---|---|
| Y = X | LINEAR, Y = X | 1 |
| Y = -X | LINEAR, Y = -X | 2 |
| Y = jX | LHCP | 3 |
| Y = -jX | RHCP | 4 |

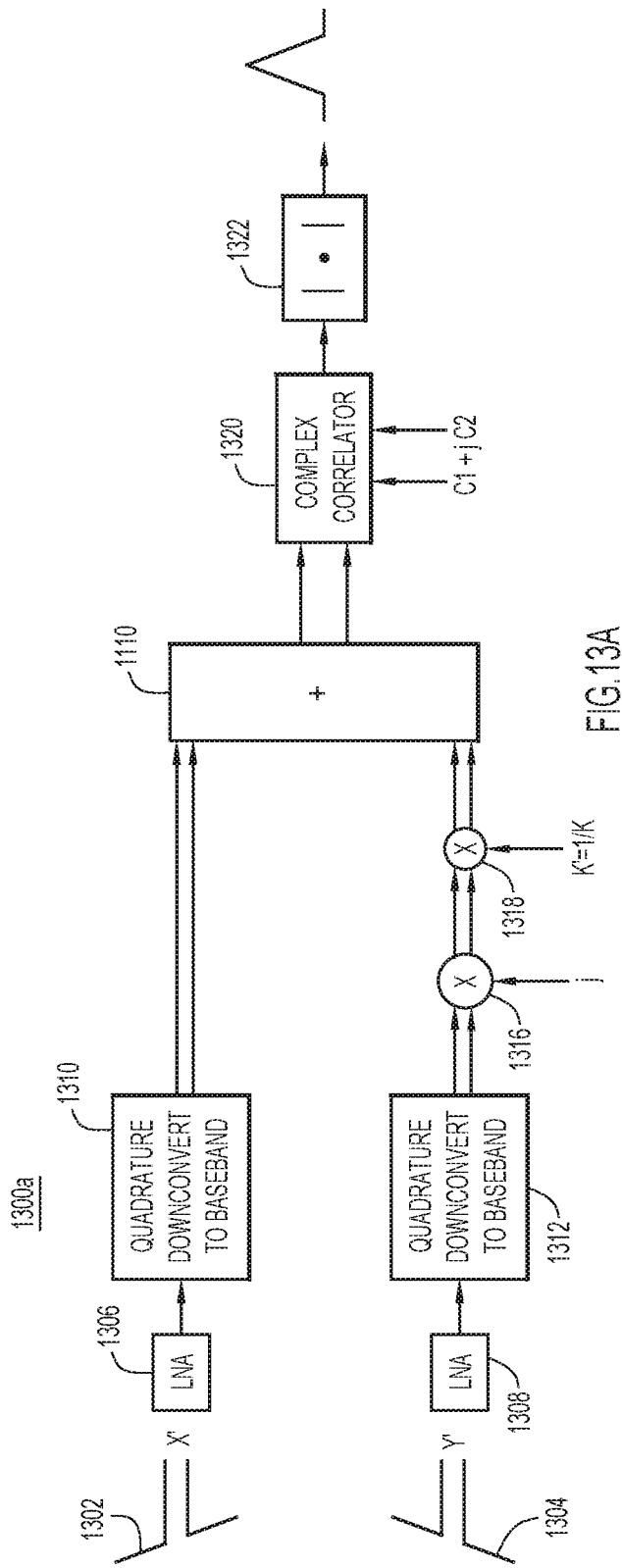

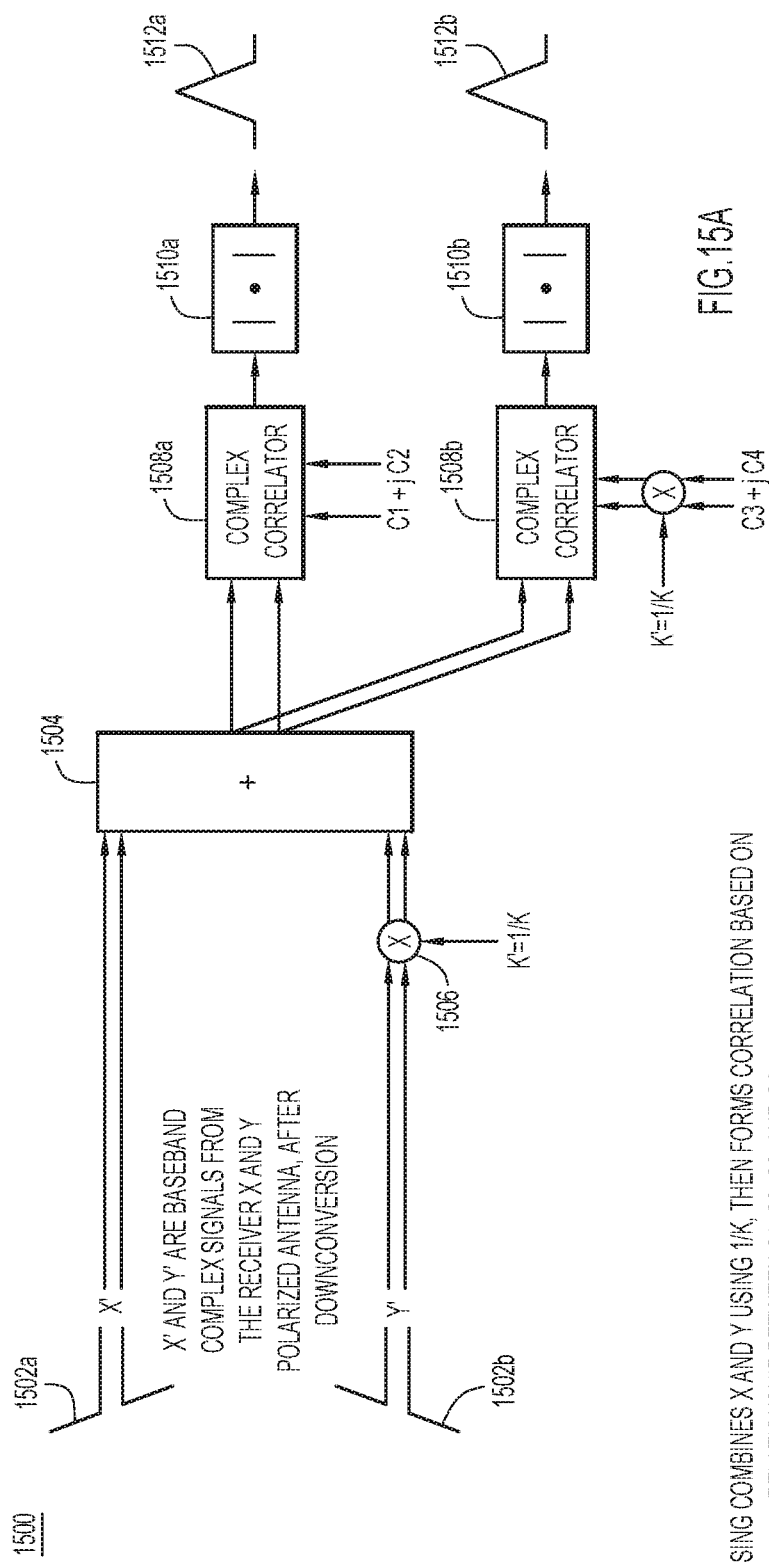

DIVERSITY POLARIZATION MODULATION

TECHNICAL FIELD

The present disclosure relates to the transmission of signals using polarization, and in particular, the transmission of navigation codes using polarization diversity.

BACKGROUND

Global Navigation Satellite Systems ("GNSS"), Global Positioning System ("GPS"), Galileo systems and Position, Navigation and Timing ("PNT") systems broadcast RF energy modulated with navigation information from spacecraft, airborne and terrestrial platforms. Such systems are susceptible to degradation due to multipath interference and intentional or unintentional interference from jammers or other sources. These systems are also susceptible to "spoofing," i.e., unauthorized transmitters which send falsified GNSS-like signals with the intent to give the user erroneous position, navigation, or timing estimates. GNSS systems present challenges in designing systems that are robust and resilient to multipath, jamming, and spoofing, while minimizing the size, weight, and power required for the GNSS payload.

Related art anti jamming techniques assume that the navigation signals will be right hand circularly polarized, while the jammer signals are assumed to be linearly polarized. Other anti jamming techniques assume that the jammer signal is radiated from below the navigation system antenna horizon, but this also not always true. Accordingly, new anti jamming techniques need to be developed.

BRIEF DESCRIPTION OF THE DRAWINGS

FIG. 4 is a chart illustrating different types of polarization that may be utilized when providing diversity polarization modulation, according to an example embodiment.

FIGS. 13A, 13B and 13C are a block diagram of a first receiver configured to receive and demodulate a signal transmitting pseudo-noise codes using diversity polarization modulation and in-phase and quadrature channels, a chart indicating the overall polarization of the received electromagnetic radiation, and a second receiver configured to receive and demodulate a signal transmitting pseudo-noise codes using diversity polarization modulation and in-phase and quadrature channels, respectively, according to example embodiments.

FIGS. 15A and 15B are a block diagram of a receiver configured to receive and demodulate four pseudo-noise codes using diversity polarization, and a chart indicating the overall polarization of the received electromagnetic radiation, respectively, according to an example embodiment.

DESCRIPTION OF EXAMPLE EMBODIMENTS

Overview

Figure 1:
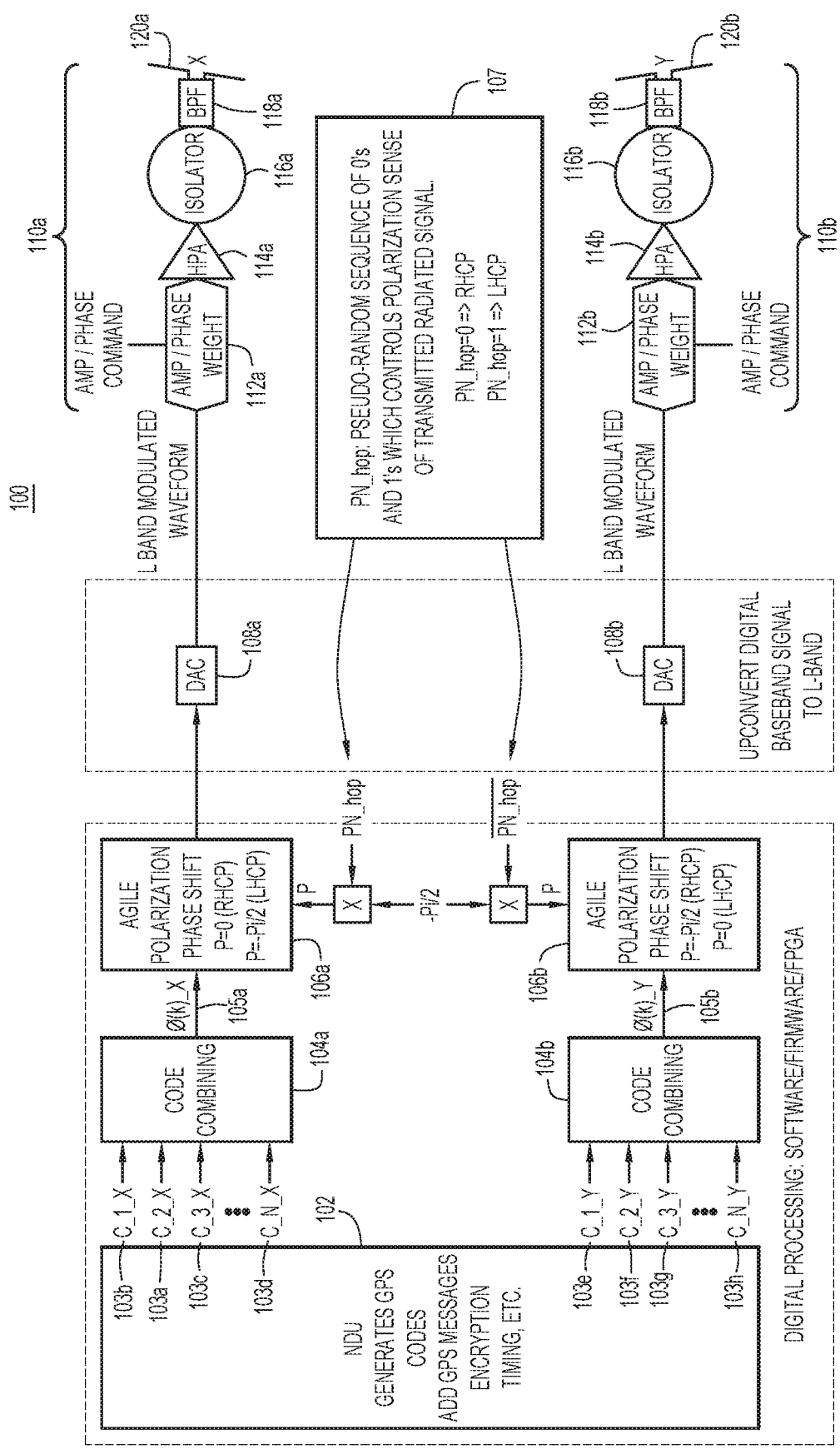
FIG. 1 is a block diagram of a transmitter configured to provide diversity polarization modulation, according to an example embodiment.

Described herein is a method that, according to one aspect, comprises transmitting a digital code from a transmitter to a receiver. This aspect further comprises transmitting information via electromagnetic waves from the transmitter to the receiver. The transmission of the information includes transmitting a first portion of the information using electromagnetic waves with a first polarization in response to a first value of the digital code, and transmitting a second portion of the information using electromagnetic waves of a second polarization in response to a second value of the digital code. According to example embodiments, the first information may include a first navigational code and the second information may include a second navigational code.

According to another aspect of the techniques described herein is a method comprising receiving, at a receiver from a transmitter, a digital code. This aspect further comprises receiving, at the receiver, first electromagnetic waves. The first electromagnetic waves are decoded corresponding to a first polarization in response to a first value of the digital code. Second electromagnetic waves are received at the receiver, and the second electromagnetic waves are decoded corresponding to a second polarization in response to a second value of the digital code. The first information and the second information may include a first navigational code and a second navigational code, respectively, and the decoding of the first navigational code and the second navigational code may include correlating with local versions of the first navigational code and the second navigational code, respectively.

According to a third aspect of the techniques described herein is a method comprising encoding a first signal of a first channel of a transmitter with first information. A second signal of the first channel of the transmitter is encoded with second information. A first signal of a second channel of the transmitter is encoded with the first information. A second signal of the second channel of the transmitter is encoded with the second information. Phase shifting by 90 degrees relative to the first signal of the second channel is performed on the first signal of the first channel. Phase shifting by 90 degrees relative to the second signal of the first channel is performed on the second signal of the second channel. The first signal of the first channel is combined with the second signal of the first channel to generate a first channel combined signal, and the first signal of the second channel is combined with the second signal of the second channel to generate a second channel combined signal. The first channel combined signal and the second channel combined signal are transmitted such that the first information is transmitted with right hand elliptical polarization and the second information is transmitted with left hand elliptical polarization. The first information and the second information may include a first navigational code and a second navigational code, respectively.

Example Embodiments

With reference made to FIG. 1, depicted therein is a transmitter 100 configured to provide the polarization diversity transmission and reception techniques described herein. Specifically, the techniques described herein provide one or more of the following, which will be described in greater detail below:

Polarization hopping Transmission and Reception Systems;

Polarization Diverse Global Positioning and/or Global Navigation Satellite Systems;

Simultaneous Dual Polarization Code Transmission and Reception Systems; and

Diverse Circular Polarization Transmission and Reception Systems; among others.

The specific example embodiment of transmitter 100 will be described in the context of a navigation code transmitter, such as a Global Position System ("GPS") transmitter, that provides polarization hopping, though the techniques described herein are applicable to other applications.

Transmitter 100 includes a navigational data unit ("NDU") 102 which, when used in a navigation system, generates navigation codes 103a-h. NDU 102 may also add encryption and timing information to the codes. Digital waveform generators ("DWGs") 104a and 104b, which are illustrated as separate elements but may be embodied as a single DWG, combines the codes to form baseband signals 105a and 105b. As will be explained in more detail below, and depending on the implementation, the baseband signals 105a and 105b may be the same or different signals. Similarly, codes 103a-d may be the same as codes 103e-h, respectively, or the codes may be different. The baseband signals 105a and 105b are then provided to phase shifters 106a and 106b. The phase shifters 106a and 106b may be controlled via a control signal 107. Depending on the embodiment, the control signal 107 may be used to provide polarization hopping and/or control a desired polarization for the one or more signals transmitted by the transmitter 100. Specifically, by altering the relative phase of signals 105a and 105b, the polarization or the electromagnetic signals transmitted by transmitter 100 may be controlled.

The output of the phase shifters 106a and 106b are input to digital-to-analog converters ("DACs") 108a and 108b, respectively. The DACs 108a and 108b convert the signals from baseband to a transmission frequency, such as a radio frequency signal. According to this specific embodiment, DACs 108a and 108b upconvert the signals from baseband to a signal with an operating frequency between 1-2 GHz, also known as an "L-Band" frequency. The analog, transmission frequency signals are then processed by an antenna assembly 110a or 110b, in which the signal is processed by amplitude/phase weight adjuster 112a or 112b, high power amplifier ("HPA") 114a or 114b, isolator 116a or 116b, band pass filter 118a or 118b, and are ultimately radiated by one of antenna elements 120a or 120b. As illustrated in FIG. 1, antenna elements 120a and 120b are embodied as the radiating elements of a crossed dipole antenna, though other types of antennas may be used. For example, separate left and/or right hand polarized antennas that share a common phase center, crossed-dipole Yagi-Uda arrays, dual polarization microstrip patch antennas, slot antennas, parabolic reflector antennas with dual polarization feeds or arrays, and others, may be used without straying from the concepts disclosed herein.

Through the use of such an arrangement, right-hand or left-hand circular polarization sense can be controlled for transmitter 100. Polarization sense may be alternated over time according to a pseudo-random pattern known only to registered users, providing "polarization hopping." This pseudo-random pattern may be provided to transmitter 100 though control signal 107. Such a transmitter may provide improved signal-to-noise ratio in jamming. Through the polarization diversity provided by transmitter system 100, the receiver or user of the transmitted signal may perform combined correlation of orthogonal linearly polarized samples to eliminate a jamming signal. Such a system may also be used to identify spoof signals. For example, the receiver or user of the transmitted signal may perform combined correlation of orthogonal linearly polarized samples to identify the spoofed signal.

Furthermore, such a system may be backwards compatible with existing related art receivers or user systems. For example, transmitter system 100 may be configured to provide information sent as right hand circular polarized information, which may be decoded by related art systems, while simultaneous providing additional information in left hand circularly polarized information.

Figure 2:
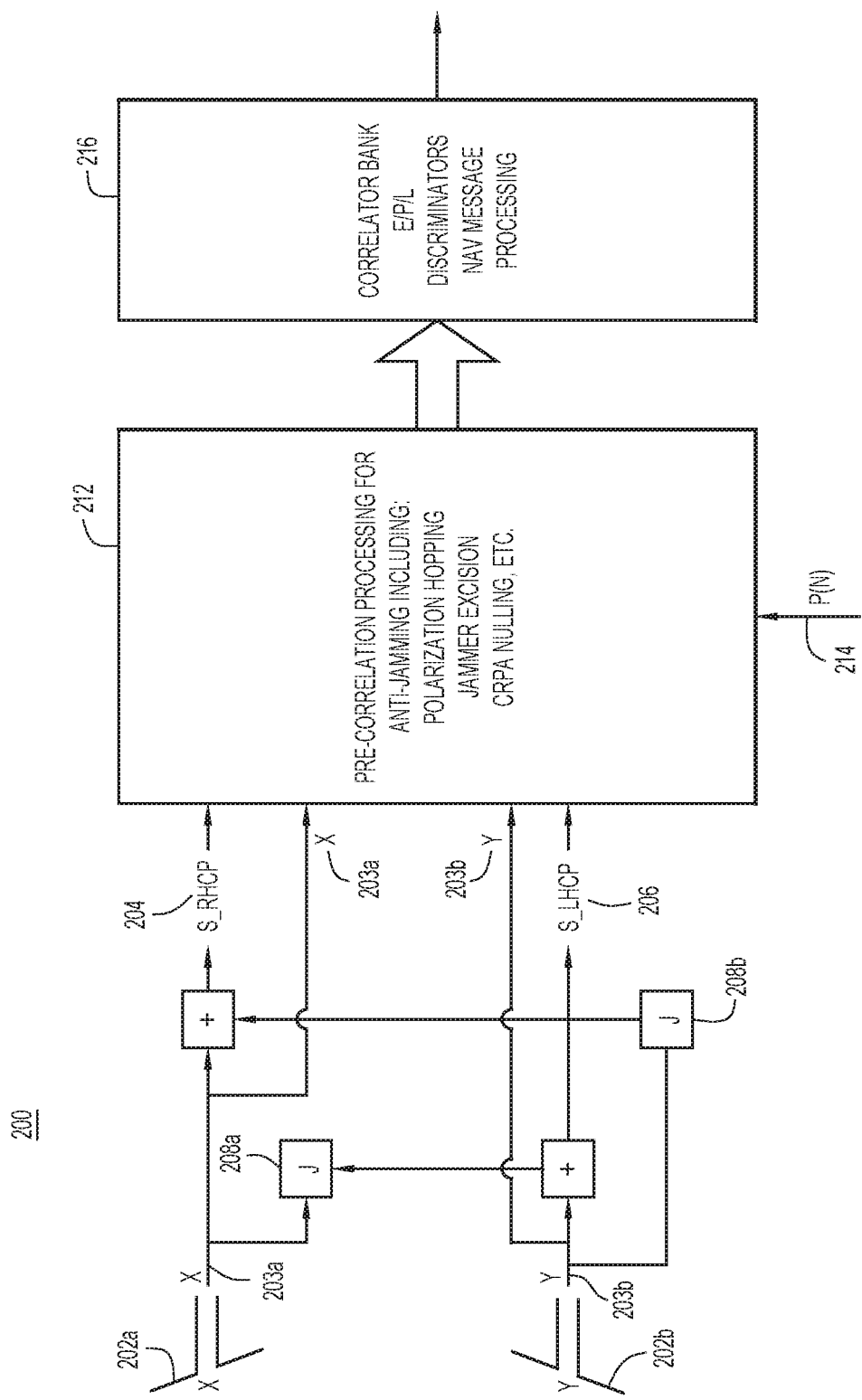
FIG. 2 is a block diagram of a receiver configured to receive and demodulate a signal transmitted with diversity polarization modulation, according to an example embodiment.

With reference now made to FIG. 2, depicted therein is a receiver configured according to the techniques described herein. Receiver 200 includes, for example, two orthogonal antenna elements 202a and 202b of a crossed dipole antenna. Though, like the antenna of the transmitter 100 of FIG. 1, the antenna of receiver 200 may be embodied as separate left and/or right hand polarized antennas with a shared phase center, crossed-dipole Yagi-Uda arrays, dual polarization microstrip patch antennas, slot antennas, parabolic reflector antennas with dual polarization feeds or arrays, and others known to those skilled in the art.

From antenna elements 202a and 202b, horizontal or "X" signal 203a and vertical or "Y" signal 203b are received, respectively. From signals 203a and 203b, right hand circularly polarized signal 204 and left hand circularly polarized signal 206 may be determined. Specifically, by providing a positive 90° phase shift (which is also described as a complex component "j") through phase shifters 208a and 208b, respectively, the right hand circularly polarized signal 204 and the left hand polarized signal 206 sent by, for example, transmitter 100 of FIG. 1 may be determined. Based upon these values, receiver processing unit 212 may perform one or more of polarization diversity processing, anti jamming processing, polarization hopping processing, Controlled Radiation Pattern Antenna ("CRPA") nulling processing, and other processing according to the techniques described herein. The processing performed by processing unit 212 may include processing performed in conjunction with a control signal 214. Control signal 214 may be, for example, a signal that corresponds to control signal 107 of FIG. 1, and that indicates the polarization state of the transmitter and transmitted signal so that the received signal may be appropriately processed. Once appropriately processed, the received signals may be sent to other functional units, such as functional unit 216, so that additional processing may be performed on the signal. This additional processing may include correlation such as complex correlation, discrimination, navigational code processing, and other functions in accordance with the techniques disclosed herein, such as processing that accounts for a random rotation ambiguity between antennas 202a and 202b of the receiver 200 and the antennas of the transmitter or jammer. For example, complex correlation will detect the codes and the time of receipt in spite of an offset between the alignment of crossed dipole antennas of a transmitter and a receiver. The correlation detection and peak will be found in the magnitude of the complex correlations, while the rotation offset will appear as part of the phase of the complex correlation, along with the phase error.

Figure 3:
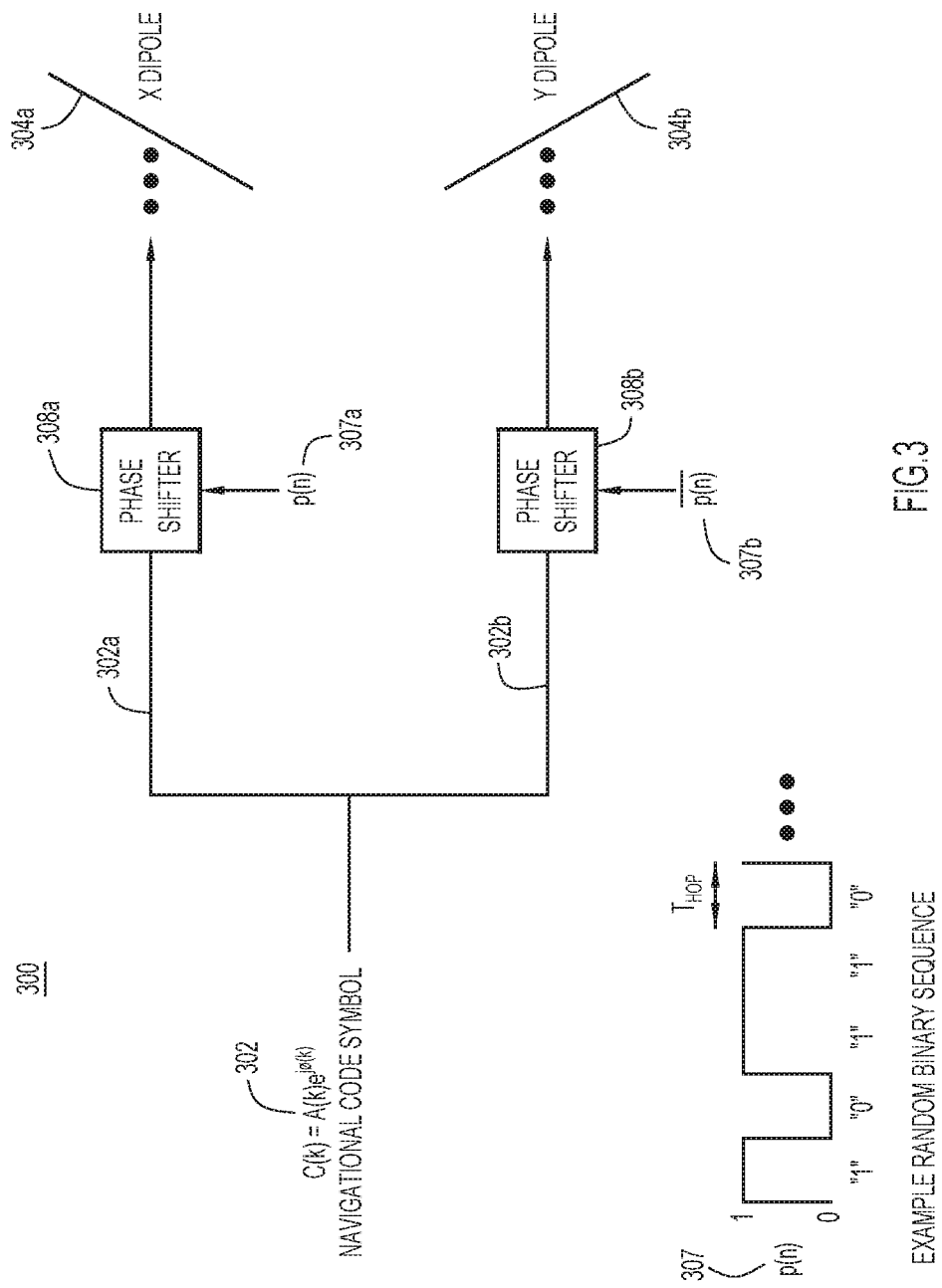
FIG. 3 is a block diagram of a first transmitter configured to use diversity polarization modulation in order to provide a polarization hopped signal, according to an example embodiment.

With reference now made to FIG. 3, the polarization hopping embodiment of the present techniques will be described. Illustrated in FIG. 3 is a portion of a transmitter 300, such as a portion of transmitter 100 of FIG. 1. Included in transmitter 300 is a signal 302 to be transmitted according to the polarization hopping described herein, and according to a specific example embodiment, signal 302 may be embodied as corresponding to a navigational code signal. This signal 302 is sent to feeds for a first radiator or antenna element 304a of a crossed-dipole antenna and a second radiator or antenna element 304b of the crossed-dipole antenna which is orthogonally oriented relative to antenna element 304a. As illustrated, a first version 302a of signal 302 is sent to antenna element 304a, and a second version 302b of signal 302 is sent to antenna element 304b. A control signal 307 is used to induce a phase difference between signal 302a and 302b.

As illustrated, control signal 307 is a pseudo random digital signal via which the transition of the code from a "1" to a "0" and vice versa, is used to alter the polarization of the signal sent by antenna elements 304a and 304b. Specifically, pseudo random code 307 serves as a control signal for phase shifters 308a and 308b, respectively. In the example of FIG. 3, control signal 307 is defined as a digital function p(n). This signal is used to induce a 90° phase shift into either of signals 302a or 302b, which results in either left or right hand polarization, depending on which signal receives the phase shift. According to the specific example of FIG. 3, phase shifter 308a and 308b receive conjugate versions of the control signal. Accordingly, when phase shifter 308a receives a "1" from the control signal, a phase shift is introduced into signal 302a, and at the same time, phase shifter 308b receives a "0" and no phase shift is introduced into signal 302b. Alternatively, phase shifters 308a and 308b may be embodied as multipliers, with multiplier 308a multiplying signal 302a by a signal mathematically described as:

$$e^{-i\frac{\pi}{2}p(n)},$$

and, multiplier 308b multiplying signal 302b by a signal mathematically described as:

$$e^{-i\frac{\pi}{2}\overline{p(n)}}.$$

As control signal 307 transitions between 1s and 0s, the polarization of the transmitted signal transitions from right hand circular polarization to left hand circular polarization, and vice versa. When used in conjunction with a navigation code transmitter, the time "T_hop" for control signal 307 may be set to the same rate at which navigational symbols are transmitted. In other words, the polarization of the transmitted signal may change on a per-symbol or code basis. T_hop may also be set to other values, including transitions within navigation symbols or codes, transitions after a predetermined number symbols or codes, and even a completely random time between transitions. Accordingly, control signal 307 may be used to alter the polarization of the signals transmitted via transmitter 300 in a manner that will appear random to receivers that are not themselves aware of control signal 307. As will be discussed with reference to FIGS. 6-9, when a receiver also has knowledge of the control signal used to randomly alter the polarization of the transmitted signal, the receiver may perform processing on the received signal that allows the receiver to eliminate jamming and/or spoofing signals from the received signal.

The phase shifts illustrated as taking place in phase shifters 308a and 308b may be introduced in the digital domain via a DWG, such as DWGs 104a and 104b of FIG. 1, or through digital phase shifters 106a and 106b of FIG. 1.

An embodiment like the transmitter illustrated in FIG. 3 may be advantageous in that it allows for the transmission of a variety of differently polarized signals. Such transmitted signals allow for benefits in addition the jamming and spoofing applications described below with reference to FIGS. 7 and 9. These additional applications will be described in conjunction with FIGS. 10-15, below. The embodiment of FIG. 3 may also be advantageous as it may be used to provide other forms of polarization other than left and right hand circular polarization. For example, if phase shifters 308a and 308b are not used to introduce phase shifts to either of signals 302a and 302b, crossed-dipole elements 304a and 304b will transmit a linearly polarized signal whose orientation is dependent on the relative amplitudes of signals 302a and 302b. If signals 302a and 302b have the same amplitude, the transmitted signal will have a 45° linear polarization.

FIG. 4 provides a chart 400 of non-limiting examples of the types of polarization that may be achieved through the techniques described herein. As noted above, if signals 302a and 302b have the same amplitude, and the same orientation, the transmitted signal will have a 45° linear polarization, as illustrated in row 405 of FIG. 4. If the signals 302a and 302b have equal magnitude but opposite orientations, the transmitted signal will have a 135° linear polarization, as illustrated in row 410 of FIG. 4. If signal 302 is provided as only signal 302a (i.e., signal 302b has an amplitude of zero), the transmitted signal will be linearly polarized in an "X" direction (sometimes referred to as "horizontal polarization" in the context of terrestrial transmission systems"), and if signal 302 is provided as only signal 302b (i.e., signal 302a has an amplitude of zero), the transmitted signal will be linearly polarized in a "Y" direction (sometimes referred to as "vertical polarization" in the context of terrestrial transmission systems"). Though, in example embodiments, the absence of either of signals 302a or 302b will result in a decreased power signal. Accordingly, when providing linear polarized signals, the linearly polarized examples illustrated in rows 405 and 410 of FIG. 4 may be the preferred way of providing linearly polarized signals. Different relative amplitude values will cause the orientation of the polarization to rotate more towards the "X" orientation if the amplitude of signal 302a is greater than that of 302b (e.g., the current associated with signal 302a leads the current associated with signal 302b by 90°), and the orientation will rotate more towards the "Y" orientation if the amplitude of 302b is greater than that of 302a (e.g., the current associated with signal 302b leads the current associated with signal 302a by 90°). If amplitude differences are introduced in conjunction with 90° phase shifts, the transmitted signal may be transmitted with either right or left hand elliptical polarization. If the amplitudes of the signals are the same, and the signals are sent with 90° phase shifts, the transmitted signals will have either right or left hand circular polarization, a special case of the more general elliptical polarization. Furthermore, the amplitudes and/or phases of signals 302a and 302b may be altered in order to alter or correct the axial ratio of the transmitted signal. For example, the amplitudes and/or phases of signals 302a and 302b may be altered in order to adjust the axial ratio of the transmitted signal to correct for nonidealities in the antenna or elsewhere in the transmitter radiofrequency chain.

Figure 5:
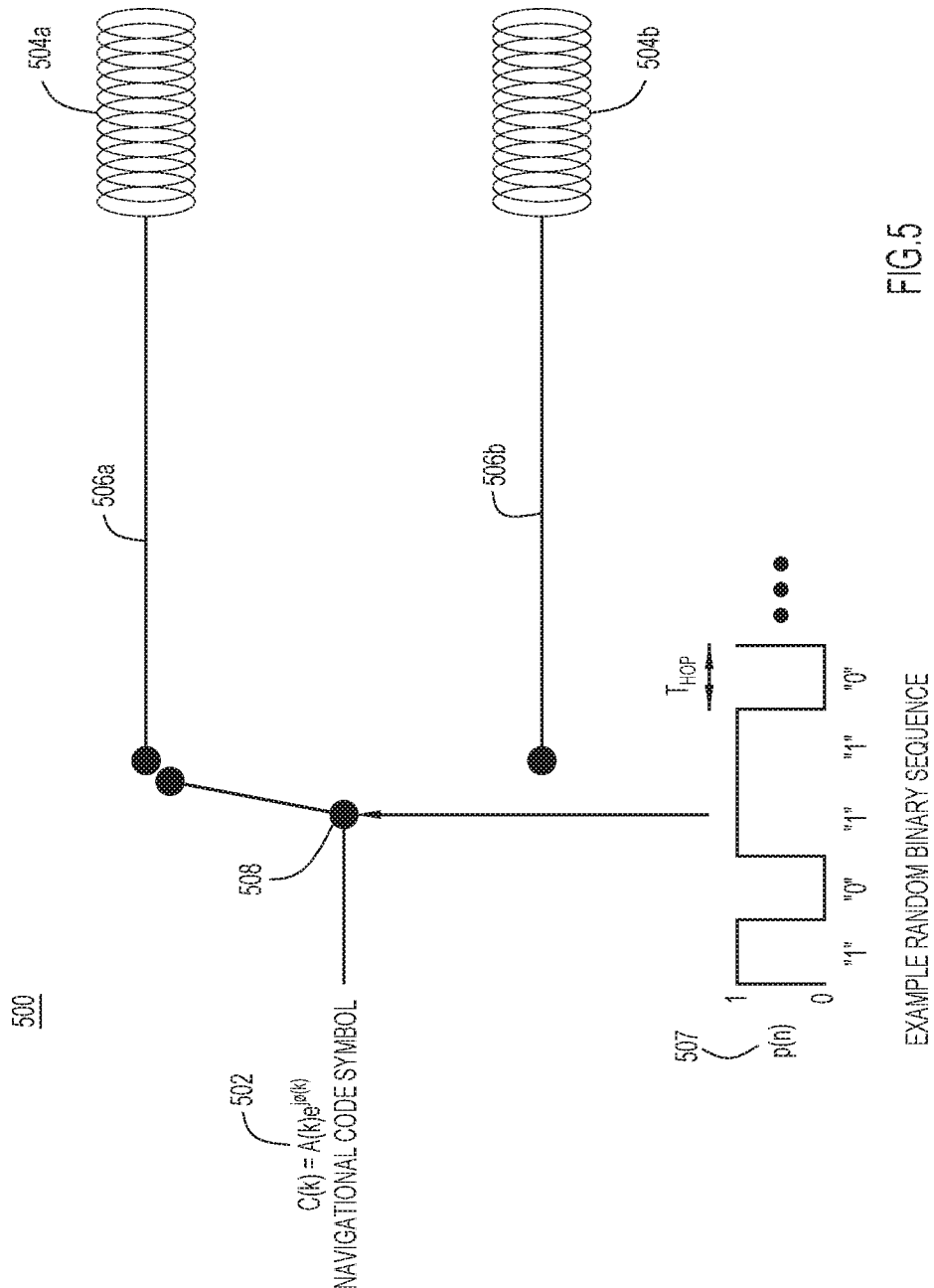
FIG. 5 is a block diagram of a second transmitter configured to use diversity polarization modulation in order to provide a polarization hopped signal, according to an example embodiment.

With reference now made to FIG. 5. Depicted therein is another embodiment of a transmitter 500 configured to transmit signals according to the techniques described herein. Like transmitter 300 of FIG. 3, transmitter 500 provides polarization diversity, but utilizes two helical antennas 504a and 504b instead of the crossed dipole radiating elements 304a and 304b of FIG. 3. For ease of illustration, antenna 504a and antenna 504b are illustrated as separate antennas, but in example embodiments, antenna 504a and antenna 504b may be the right and left hand radiating windings of a helical antenna that share the same core, and therefore, share the same phase center. The radiating winding 504a is wound in a direction opposite to that of the radiating winding 504b. Accordingly, windings 504a and 504b are configured to radiate with circular polarization with opposite orientations. Also included in transmitter 500 is switch 508. Switch 508 is configured to switch between feed 506a and feed 506b in response to control signal 507. Like control signal 307 of FIG. 3, control signal 507 is a pseudo random digital signal. Switch 508 is configured to respond to control signal 507 such that when control signal 507 is a "1," switch 508 connects signal 502 to feed 506a. When control signal 507 is a "0," switch 508 connects signal 502 to feed 506b. Accordingly, based on pseudo random control signal 507, the polarization of the transmitted signal will "hop" between the circular polarization provided by winding 504a, and the opposite direction circular polarization provided by winding 504b. According to other example embodiments, an array of eight helical antennas may be arranged in a circle. By using four right hand circularly polarized antennas alternately arranged with four left hand polarized antennas, polarization may be provided such that a phase center for the transmission remains in a fixed location. By switching between each set of four antennas, transmissions with a constant phase center may be provided for use in applications, such as GPS with centimeter level accuracy.

Figure 6:
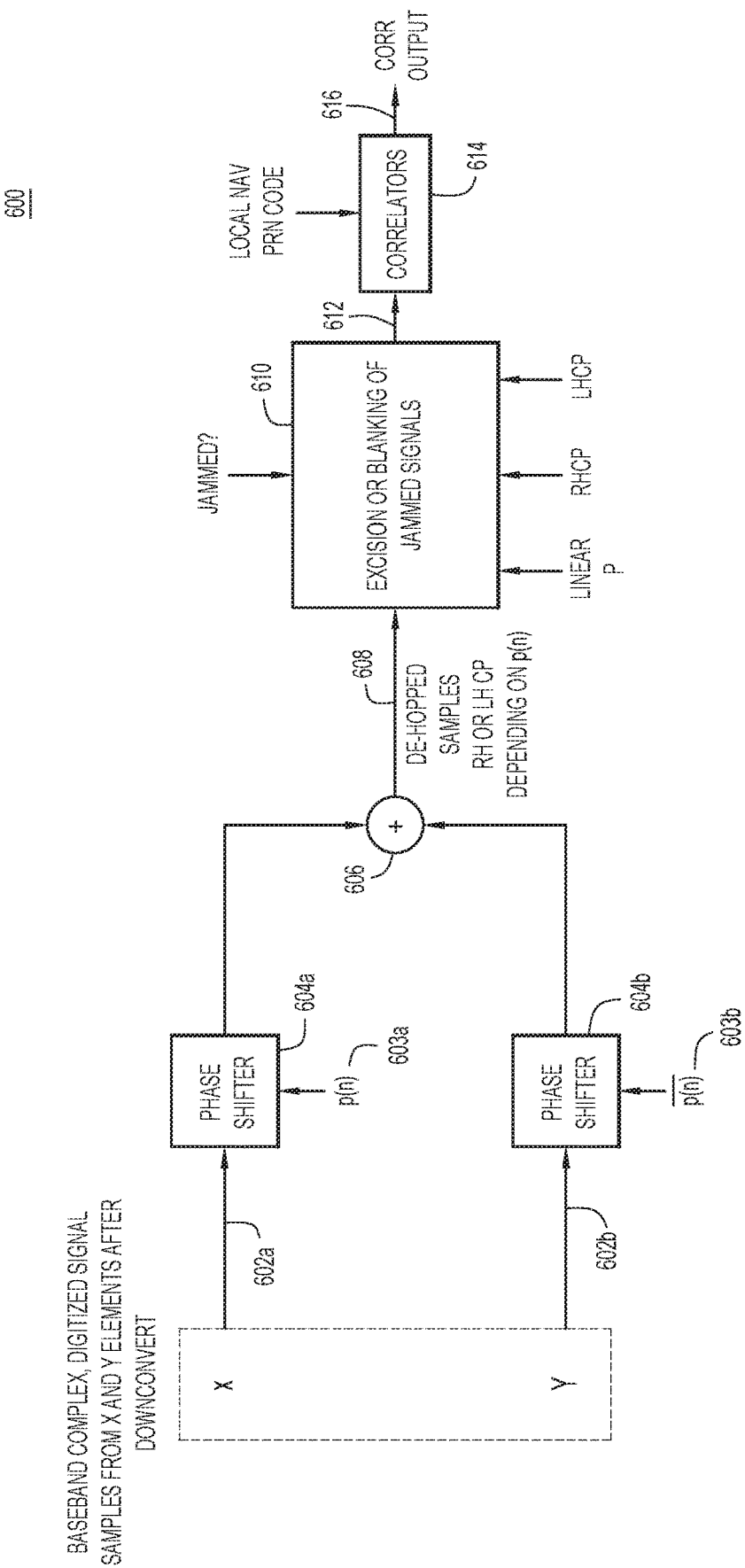
FIG. 6 is a block diagram of receiver configured to receive and demodulate a polarization hopped signal transmitted with diversity polarization modulation, according to an example embodiment.

With reference now made to FIG. 6, depicted therein is a receiver 600 configured to determine the polarization of a jammer signal within a polarization hopped navigation signal, excise or blank the jamming frequency, and correlate the signal to determine the time of receipt of the transmitted navigation codes. More specifically, receiver 600 receives a signal from a transmitter like those illustrated in FIGS. 1, 3 and/or 5, and utilizes a control code corresponding to control codes 107, 307 and/or 507 of FIGS. 1, 3 and/or 5, respectively, to identify and excise a jamming signal or spoof signal from the received navigation signal.

Signals 602a and 602b represent the signals received from, for example, a crossed dipole antenna or other dual polarization antenna systems. According to the present example, signal 602a represents the signal received from the "X" oriented element of a crossed dipole antenna and signal 602b represents the signal received from a "Y" oriented element of the crossed dipole antenna. Signals 602a and 602b have been down converted to baseband. Phase shifters 604a and 604b receive signals 602a and 602b, respectively, and will phase shift either signal 602a or 602b, as appropriate, so that the receiver may correctly decode the received signal. For example, phase shifters 604a and 604b provide a positive 90° shift to signals 602a or 602b, depending on the current state of control signals 603a and 603b. Similar to the discussion above with reference to FIG. 3, phase shifters 604a and 604b may be embodied as multipliers, with multiplier 604a multiplying signal 602a by a signal mathematically described as:

$$e^{+i\frac{\pi}{2}p(n)}.$$

Similarly, multiplier 604b may multiply signal 602b by a signal mathematically described as:

$$e^{+i\frac{\pi}{2}\overline{p(n)}}.$$

According to the example of FIG. 6, control codes 603a and 603b are the inverse of the control codes that were used to provide the polarization hopped signal received by receiver 600. For example, if the signals 602a and 602b were received from receiver 300 of FIG. 3, controls codes 607a and 607b would be the inverse of control codes 307a and 307b, respectively. If the received signal was generated by phase shifting the feed signal for an "X" radiating element of a crossed dipole transmitter antenna, phase shifter 604a induces a phase shift into signal 602a that is equal in magnitude but in the opposite direction of the phase shift applied by the transmitter. If the received signal was generated by phase shifting the feed signal for a "Y" oriented radiating element of the crossed dipole transmitter antenna, phase shifter 604b induces a phase shift into signal 602b that is equal in magnitude but in the opposite direction of the phase shift applied by the transmitter. In other words, if a pseudo random digital code (e.g., control code 107, 307 and/or 507 from FIGS. 1, 3 and 5, respectively) is used to induce a phase shift in the transmitted signal, the inverse of that codes is used at the receiver. Control codes 603a and/or 603b may be communicated to receiver 600 by the transmitter during a training sequence sent to the transmitter.

Control codes 603a and/or 603b may also be transmitted to the receiver via an out-of-band signal. To ensure the security of the codes 603a and/or 603b, the codes made may be transmitted using an encryption key known only to trusted users of the navigation system. The phase shifted signals are then combined by combiner 606 to form signal 608.

Signal processing unit 610 then processes signal 608 to determine whether or not there is a jammer signal included in signal 608. If a jammer signal is detected, the jammer signal is excised or blanked, generating signal 612. The processing performed in signal processing unit 610 will be described in greater detail with reference to FIG. 7. Signal 612 is then correlated by correlator 614, and the correlator output corresponding to the transmitted navigation codes are output as signal 616, so that ranging and timing information may be derived.

Figure 7:
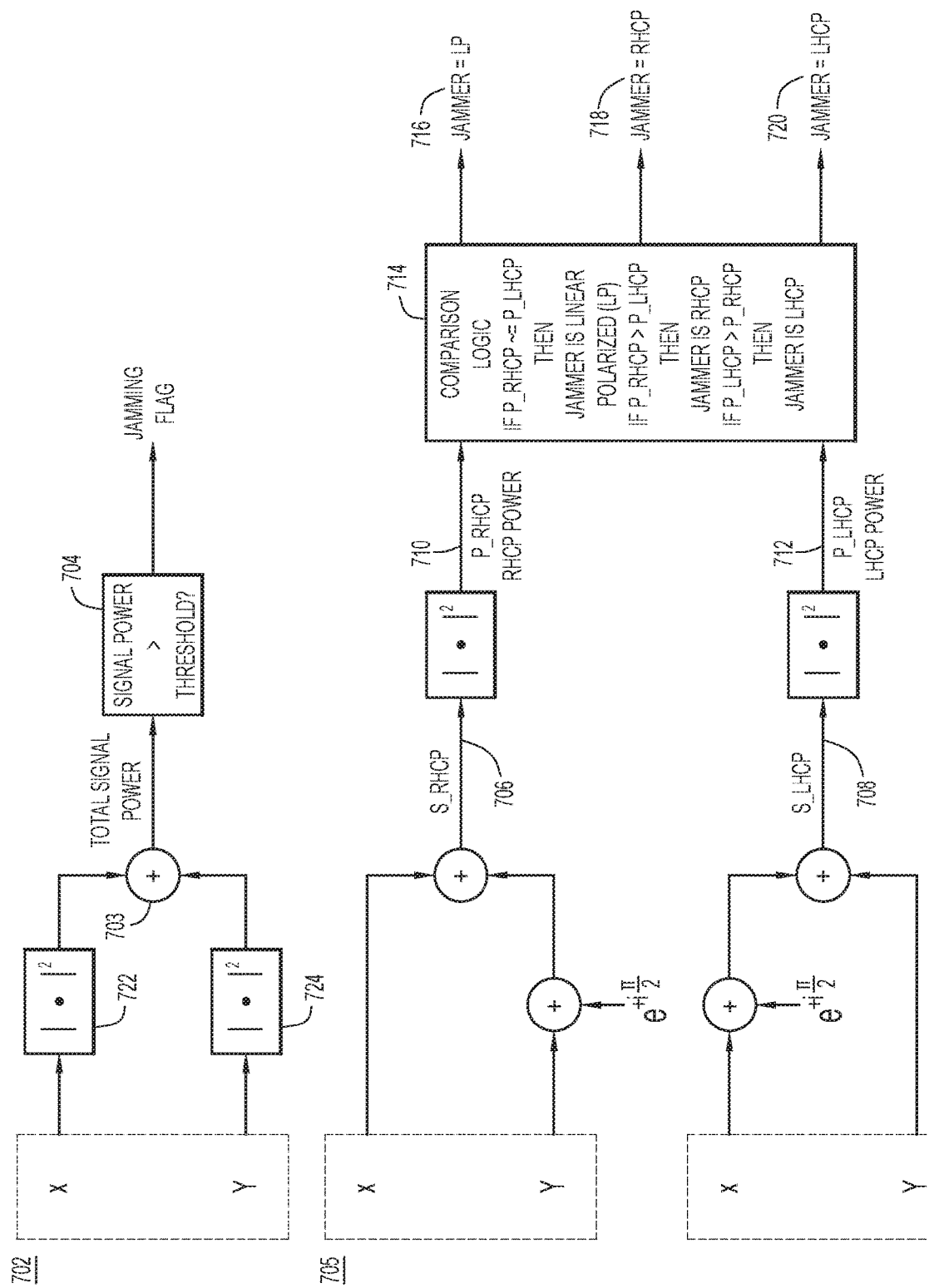
FIG. 7 is a block diagram of the signals and logic used in conjunction with a polarization hopped signal to provide anti-jamming techniques, according to an example embodiment.

With reference now made to FIG. 7, depicted therein are the logic and signals utilized to detect and excise or blank a jammer signal based upon a polarization-hopped navigation signal. For example, the signals and logic illustrated in FIG. 7 may be utilized in receiver processing unit 212 of FIG. 2 and/or processing unit 610 of FIG. 6. Before a jammer signal may be excised or blanked, a determination is made whether or not a jammer signal is present. Accordingly, first processing 702 is performed in order to determine whether or not a jammer signal is present. In processing 702, the total power of the received signal is measured and compared to a predetermined threshold. Specifically, the power 722 of samples received from the "X" element of crossed-dipole antenna is combined with the power 724 of samples from the "Y" element of the crossed-dipole antenna in combiner 703 to measure the amount of total power being received. If the total signal power measured in power measurement 704 is greater than this threshold, it may be determined that a jammer signal is present in the received signal. This threshold value may be set based upon the expected power in the signal received from a satellite or platform, including aircraft and terrestrial platforms. Accordingly, any significant amount of signal power over this expected value may be indicative of a jammer signal.

Once a jammer signal is detected, processing 705 is performed. Specifically, comparison 714 is performed in which the received right hand circular polarized signal is compared to power in the left hand circular polarized signal. More specifically, to determine the power in the right polarized circular signal, the samples received from the "X" element of the crossed-dipole antenna are combined with 90° phase-shifted samples from the "Y" element of the crossed-dipole antenna to measure the amount of power being received as the right hand circular polarized signal 706. In the example of FIG. 7, the samples from the "Y" element of the crossed-dipole antenna are phase shifted by multiplying them by a signal having a mathematical description of $e^{(i\pi/2)}$. Similarly, the samples received from the "Y" element of crossed-dipole antenna are combined with 90° phase-shifted samples from the "X" element of the crossed-dipole antenna to measure the power in the received signal as the left hand circular polarized signal 708. Power measurements 710 and 712 are then taken of the right hand circularly polarized signal 706 and the left hand circularly polarized signal 708, respectively. These power measurements are then evaluated by logic 714. If the power 710 in right hand circularly polarized signal 706 is approximately equal to the power 712 in the left hand circularly polarized signal 708, it may be determined that the jammer signal is linearly polarized, and signal 716 is generated. If the power 710 in right hand circularly polarized signal 706 is greater than the power 712 in the left hand circularly polarized signal 708, it may be determined that the jammer signal is right hand circularly polarized, and signal 718 is generated. If the power 712 in left hand circularly polarized signal 708 is greater than the power 710 in the right hand circularly polarized signal 706, it may be determined that the jammer signal is left hand circularly polarized, and signal 720 is generated.

The logic illustrated in FIG. 7 may take place at the same frequency with which the polarization hopping changes (e.g., the operations illustrated in FIG. 7 may repeat at a time interval of T_hop as illustrated in FIG. 3). Accordingly, even if the jammer is performing polarization hopping, the jamming will only "match" the polarization of the transmitting signal, on average, 50 percent of the time because the jammer will not know the hopping sequence, and due to the correlation techniques used to retrieve the navigation codes, the navigation system may still operate successfully. Specifically, losing half of the hops is equivalent to a 3 dB loss in signal power, whereas a conventional receiver would be degraded by much more than this amount in jamming. When the jammer is on the opposite polarization, its energy will be rejected by a degree commensurate with the cross-polarization isolation ("XPI"). For a typical circular polarized antennas, XPI is between 20 to 25 dB. Accordingly, on average, receiver performance will have improved by the XPI—3 dB, resulting in a net anti-jamming improvement of 17 to 22 dB.

Figure 8:
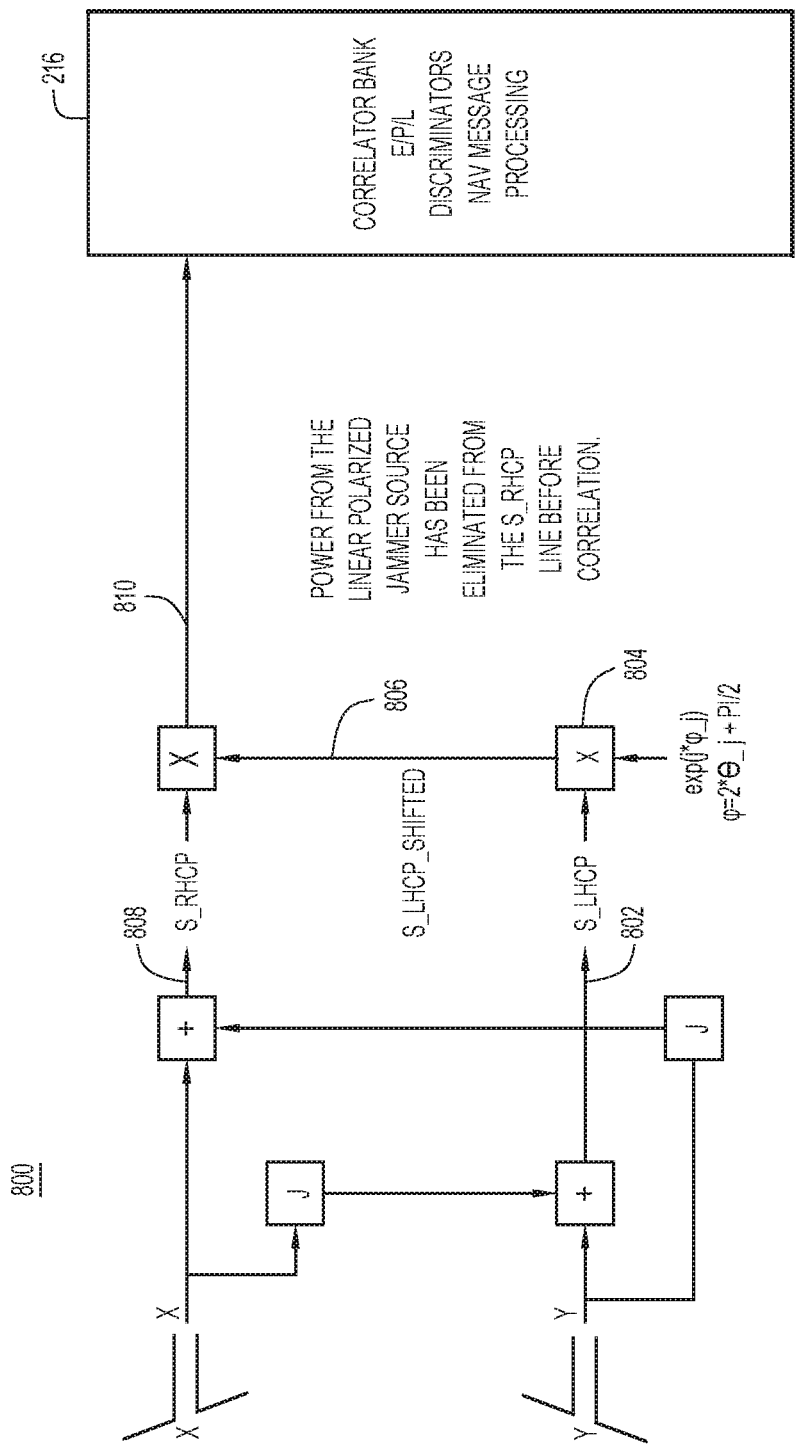
FIG. 8 is a block diagram of a receiver configured to excise a linearly polarized jamming signal from a diversity polarization modulated navigation signal, according to an example embodiment.

Returning for FIG. 6, if it is determined in the operations illustrated in FIG. 7 that the jammer signal is linearly polarized, then the signal 612 may be selected as the right hand circularly polarized signal with the jammer signal excised therefrom, as will be detailed in FIG. 8. As illustrated in FIG. 8, the left hand circularly polarized signal 802 received by receiver 800 is shifted by phase shifter 804 such that the jammer power in the phase-shifted left hand circularly polarized signal 806 is shifted 180° from the jammer power in the right hand circularly polarized signal 808. Signal 808 is then combined with signal 806 to generate signal 810 from which the jammer signal has been eliminated. Signal 810 is then provided to correlator 812.

Once again returning to FIG. 6, if processing unit 610 determines that the jammer signal is right hand circularly polarized, then processing unit 610 provides the left hand circularly polarized portion of the signal received at the transmitter 600 as the signal 612. The right hand circularly polarized portions of the signal received at transmitter 600 are blanked. The left hand circularly polarized portion of the received signal are properly received because the jamming energy is on the other polarization and is rejected. Similarly, if processing unit 610 determines that the jammer signal is left hand circularly polarized, then right hand circularly polarized portion of the signal received at transmitter 600 is provided to correlator 614 as signal 612, and the left hand circularly polarized portion of the signal received at the transmitter 600 is blanked by processing unit 610. Even though the blanked portions of the signal are not utilized, and this will happen on average, up to 50% of the time for a circular polarized jammer, due to the use of correlation to determine the received signal, receiver 600 may still operate effectively because this corresponds to only a 3 dB reduction in signal power, whereas a conventional system would suffer a degradation in jamming of more than 30 dB.

As noted above, the techniques described herein may provide an anti jamming improvement of more than 17 dB compared to related art techniques. This improvement may be added to jammer rejection provided by a controllable receive pattern array antenna ("CRPA"), increasing the power level of the transmitter, and other means so that a total solution may be provided to combat jamming. More advanced, higher precision antennas, or those with electronic corrections to axial ratio, may achieve higher levels of XPI especially if they can be pointed in the direction of the jammer. In such example embodiments, levels of XPI can be 30 to 35 dB, meaning that the anti jamming improvements from the techniques described herein would increase commensurate with the improvement in XPI. For such antennas, the anti jam improvements may be between 27 and 32 dB.

Figure 9:
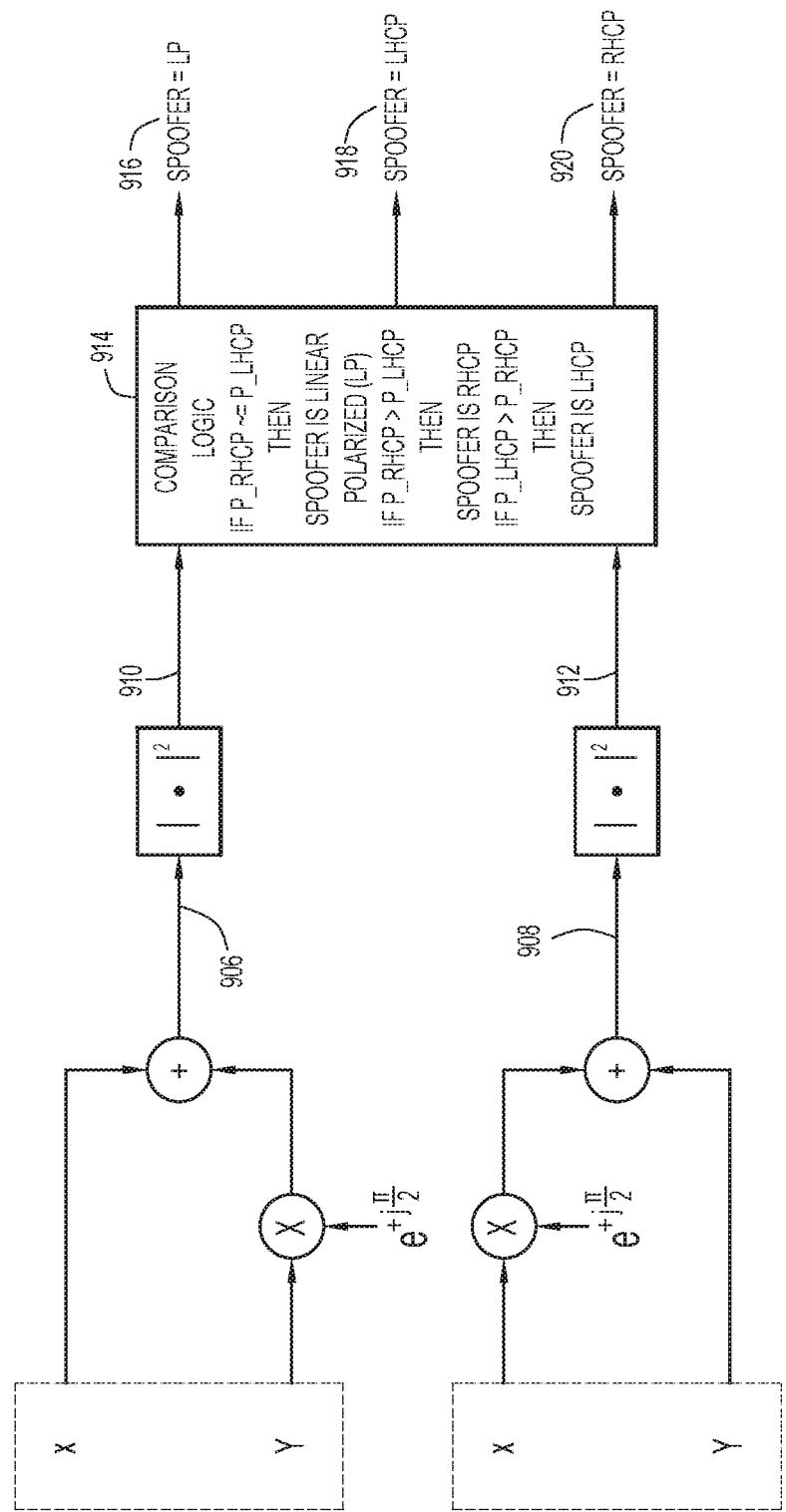
FIG. 9 is a block diagram of the signals and logic used in conjunction with a polarization hopped signal to detect and eliminate a spoof signal in a diversity polarization modulated navigation signal, according to an example embodiment.

With reference now made to FIG. 9, depicted therein is an illustration of the processing performed by receiver 900 in order to identify a spoofing signal using the polarization hopping techniques described herein, which is analogous to that performed to identify a jammer, as illustrated in FIG. 7. Specifically, comparison 914 is performed in which the received right hand circular polarized signal is compared to power in the left hand circular polarized signal. More specifically, to determine the power in the right polarized circular signal, the samples received from the "X" element of crossed-dipole antenna are combined with 90° phase-shifted samples from the "Y" element of the crossed-dipole antenna to measure the amount of power being received as the right hand circular polarized signal 906. In the example of FIG. 9, the samples from the "Y" element of the crossed-dipole antenna are phase shifted by multiplying them by a signal having a mathematical description of e^(i π/2). Similarly, the samples received from the "Y" element of crossed-dipole antenna is combined with 90° phase-shifted samples from the "X" element of the crossed-dipole antenna to measure the power received as the left hand circular polarized signal 908. Power measurements 910 and 912 are then taken of the right hand circularly polarized signal 906 and the left hand circularly polarized signal 908, respectively. These power measurements are then evaluated by logic 914. If the power 910 in right hand circularly polarized signal 906 is approximately equal to the power 912 in the left hand circularly polarized signal 908, it may be determined that the spoofer signal is linearly polarized, and signal 916 is generated. If the power 910 in right hand circularly polarized signal 906 is greater than the power 912 in the left hand circularly polarized signal 908, it may be determined that the spoofer signal is right hand circularly polarized, and signal 918 is generated. If the power 912 in left hand circularly polarized signal 908 is greater than the power 910 in the right hand circularly polarized signal 906, it may be determined that the spoofer signal is left hand circularly polarized, and signal 920 is generated. Based upon signals 916, 918 or 920, the receiver may identify spoof signals and remove them from the correlation of the signals through a process analogous to that described with reference to FIGS. 6-8 for excising a jammer signal.

Figure 10:
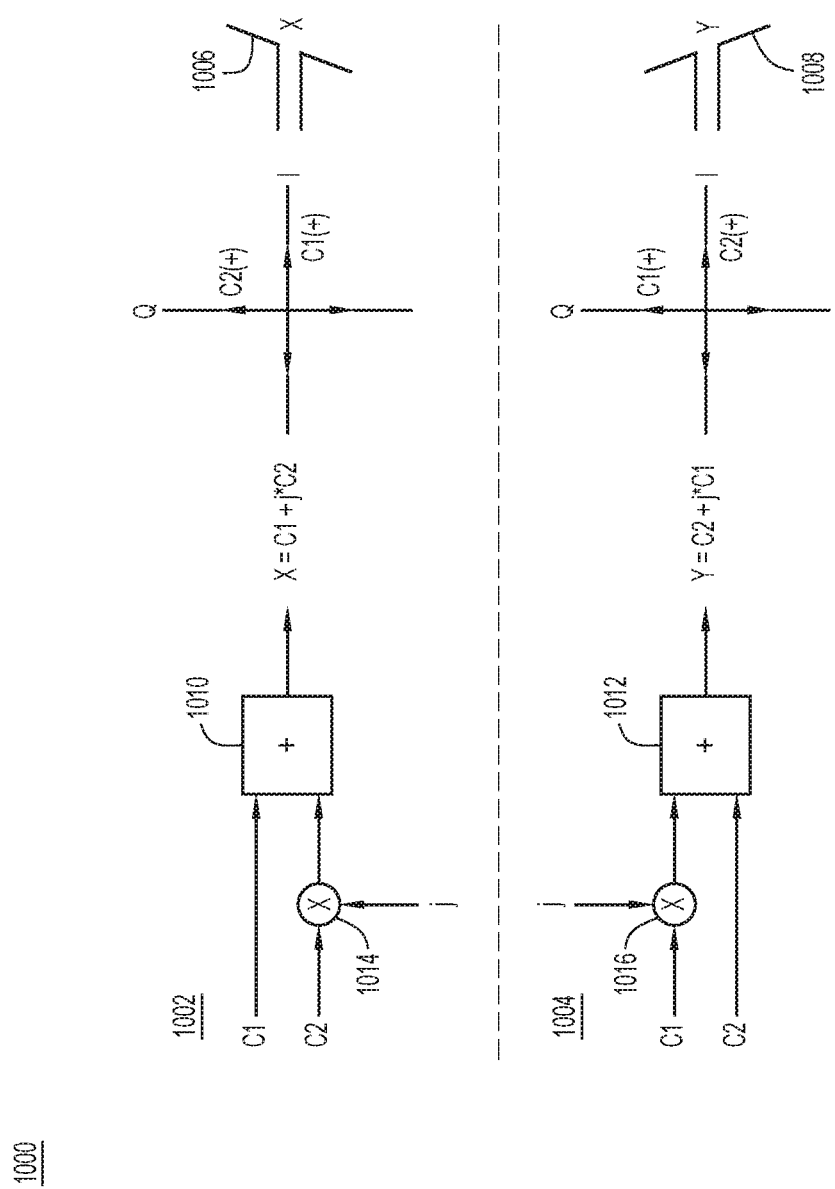
FIG. 10 is a block diagram of a transmitter configured to simultaneously send first and second codes using right hand circular polarization and left hand circular polarization, respectively, according to an example embodiment.

With reference now made to FIG. 10, depicted therein is an example embodiment of a transmitter 1000 through which polarization diversity is used to provide simultaneous transmission of right hand circularly polarized signals and left hand circularly polarized signals. This embodiment is backwards compatible with related art systems while simultaneously providing polarization diversity. These techniques also allow for the transmission of additional codes using right and left hand polarized signals in one transmission signal.

Illustrated in FIG. 10 is the simultaneous transmission of two codes, C1 and C2, with opposite circular polarization sense on the same transmission signal and the same antenna. As illustrated, a first channel 1002 feeds the "X" element 1006 of a crossed dipole antenna, and a second channel 1004 feeds the "Y" element 1008 of the crossed dipole antenna. Each of channels 1002 and 1004 contains an adder 1010 and 1012, respectively. The adder performs the sum of the two inputs. The results are complex terms in which C1 is the real part of X, which is the in-phase component of the signal, and C2 is the imaginary or quadrature component of the signal output by adder 1010. Similarly C1 is the quadrature component of the output of adder 1012, C2 is the in-phase component of the output of adder 1012. In channel 1002, the signal feeding C1 to combiner 1010 is not phased shifted, while in channel 1004, the signal feeding code C1 to combiner 1012 is phase shifted by phase shifter 1016 a positive 90° relative to the C1 in channel 1002. This will result in left hand circular polarization transmission of code C1. Code C2, on the other hand, is fed to combiner 1010 with phase shifter 1014 providing a positive 90° phase shift relative to the signal providing C2 to combiner 1012 in channel 1004. Accordingly, C2 is transmitted with right hand circular polarization.

Figure 11:
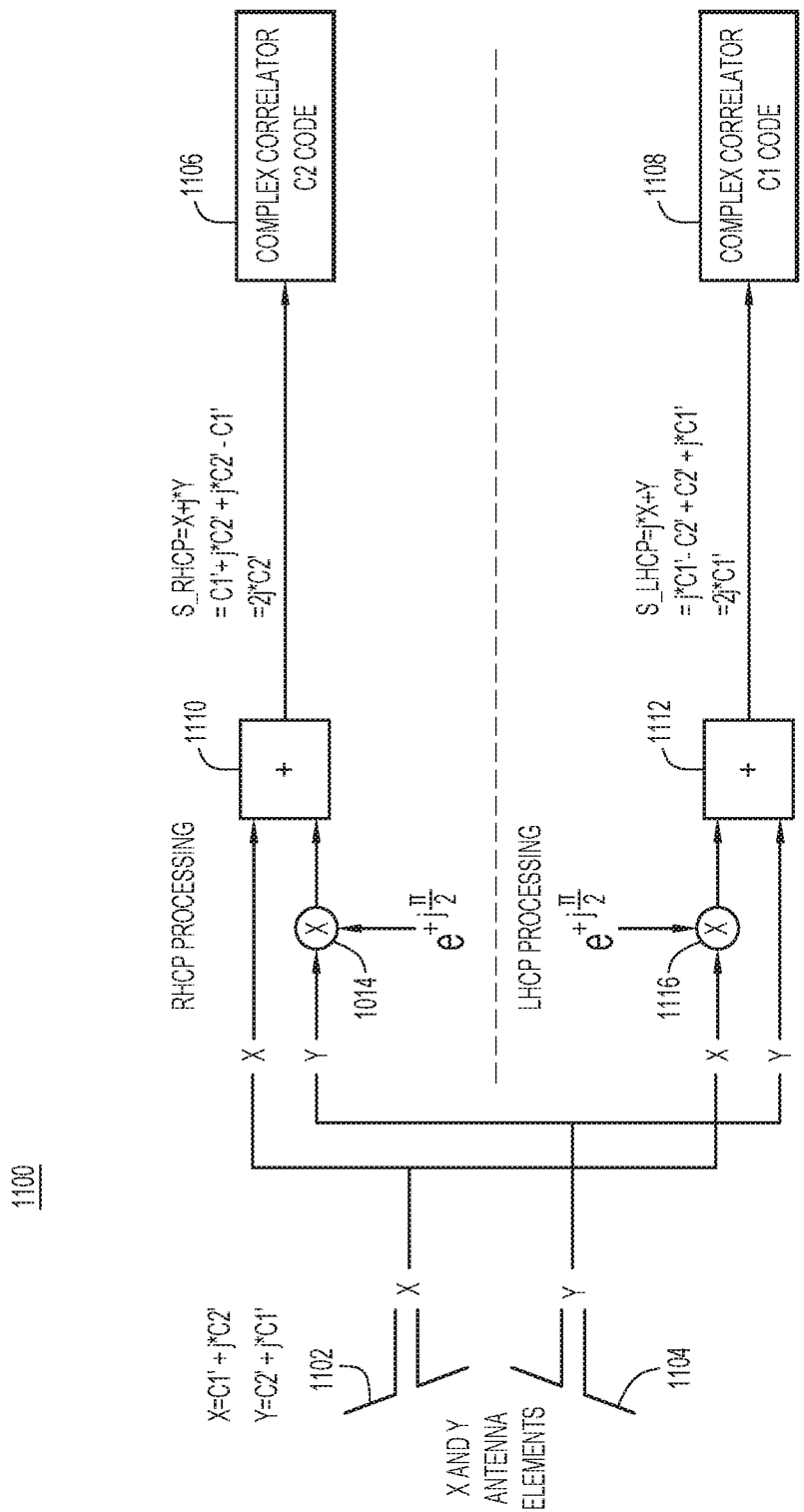
FIG. 11 is a block diagram of a receiver configured to receive and demodulate a signal containing first and second codes using right hand circular polarization and left hand circular polarization, respectively, according to an example embodiment.

Because the signals will be correlated at the receiver end, with one correlation being performed on the right hand circular polarization portion of the signal and a second correlation being performed on a left hand circular polarization portion of the signal, the two codes may be retrieved from the same transmission signal as values transmitted with opposite polarization sense. A receiver 1100 performing these correlations is illustrated in FIG. 11. Even though the right hand circular polarization receiver correlation will detect C2 only and not C1, and the left hand circular polarization receiver correlation will detect C1 only and not C2, as would be the case with right hand circular polarization transmission or left hand circular polarization transmission, the aggregate transmitted energy from the transmitter antenna is actually linearly polarized, jumping between the polarizations illustrated in rows 405 and 410 of FIG. 4 above. This linear polarization is nevertheless transparent to each of the circular polarized receivers. Each circular polarized receiver will find the energy of its respective signal (e.g., a pseudo noise code, described in more detail below) on the correct circular polarized sense as though it were transmitted with a conventional right hand or left hand circular polarized antenna because each of these right hand and left hand circular polarized components is part of the aggregate signal.

As illustrated in FIG. 11, two correlations are performed on the signals received from "X" and "Y" crossed dipole element 1102 and 1104, respectively. Right hand circular polarization correlation is performed by correlator 1106 while left hand circular polarization correlation is performed by correlator 1108. Specifically, the "X" and "Y" signals are fed to adder 1110 with the "Y" signal receiving a phase shift from phase shifter 1114 that is the opposite of the shift provided to code C2 by phase shifter 1014 of FIG. 10. Accordingly, when the sample from the "Y" element 1104 is added to the sample from the "X" element 1102 and correlated by correlator 1106, correlator 1106 detects code C2 and provides a correlation peak for this code. This right hand circular polarization processing isolates the C2 code and reduces the noise produced by the C1 code transmitted on the opposite sense, by the XPI level of 20 dB or more.

Similarly, the "X" and "Y" signals are fed to adder 1112 with the "X" signal receiving a phase shift from phase shifter 1116 that is the opposite of the phase shift provided to code C1 by phase shifter 1016 of FIG. 10. Accordingly, when the sample from the "Y" element 1104 is added with the sample from the "X" element 1102 and correlated by correlator 1108, the correlator 1108 detects code C1 and provides a correlation peak for this code. This left hand circular polarization processing isolates the C1 code and reduces the noise produced by the C2 code transmitted on the opposite sense, by the XPI level of 20 dB or more.

As would be understood by the skilled artisan, the equations shown in the FIG. 11 are simplified for the case with no relative rotation shift between the transmitter antenna and the "X" and "Y" elements 1102 and 1104 of FIG. 11. The equations also assume no rotation of signal polarization from the transmission channel. However, the processing of FIG. 11 also works when there is a rotation shift of the polarization. In that case, the right hand circular polarization and the left hand circular polarization output will have an added phase term due to the above-described rotation shift. The complex correlation performed in correlators 1106 and 1108 will extract this phase and the final correlated output is the magnitude of the correlation which is not affected by the rotation term.

It is noted that correlation provided by correlator 1106 is essentially a related art right hand circular polarization receiver. Accordingly, code C2 could be received by a receiver only configured with a single channel. Therefore, a transmitter as illustrated in FIG. 10 can provide backwards compatibility with legacy systems—transmitting code C2 using right hand circular polarization for legacy receivers, and also transmitting C1 using left hand circular polarization for a new or different group of receivers. The transmitter of FIG. 10 may also transmit C2 using right hand circular polarization for legacy users, while transmitting C1 using the polarization diversity techniques described herein. Furthermore, the techniques illustrated in FIGS. 10 and 11 are particularly applicable to correlation systems as it is the correlation of the "X" and "Y" signals that allows the two different codes C1 and C2 to be retrieved from the same transmission signal.

Figures 12A, 12B:
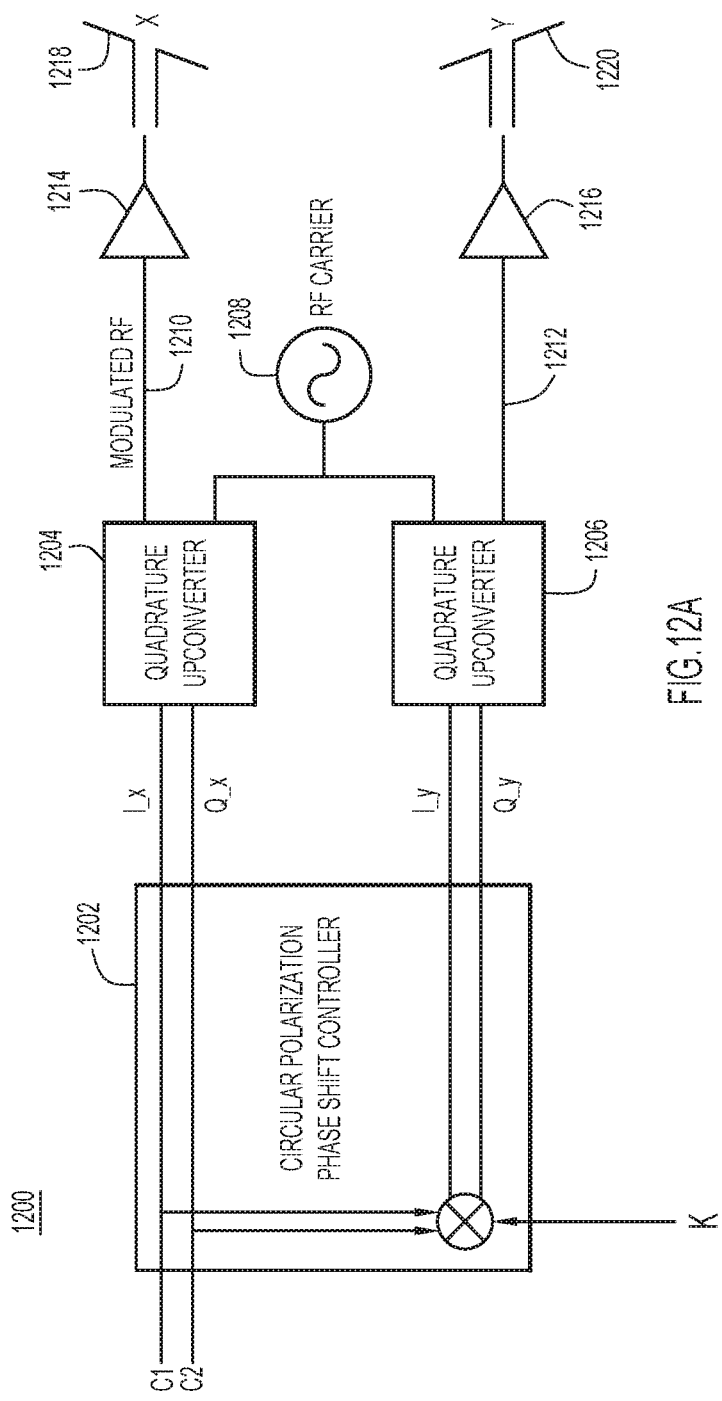
FIGS. 12A and 12B are a block diagram of a transmitter configured to transmit pseudo-noise codes using diversity polarization modulation and in-phase and quadrature channels, and a chart indicating the overall polarization of the output electromagnetic radiation, respectively, according to an example embodiment.

With reference now made to FIG. 12, depicted therein is a transmitter 1200 that allows for the transmission of signals according to the techniques described here. For example, transmitter 1200 may be configured to transmit three independent pseudo noise codes ("PN codes"), two of which are transmitted with right hand circular polarization and left hand circular polarization, respectively, and a third is transmitted via the polarization sense of the transmitted signal. Specifically, the two codes PN_1 and PN_2 are transmitted on the in-phase and quadrature channels of the output signal such that the values C1 and C2 are transmitted with opposite polarization sense, respectively. At the same time, the overall polarization sense of the transmitted signal (positive or negative linear polarization, right hand polarization or left hand polarization) depends on the value of K. By altering the value of K, the polarization sense of the overall signal will change as illustrated in FIG. 12B. For example, by giving K a value of "1", the polarization of the transmitted signal will be linear polarization in which both the X and Y transmitted portions are positively oriented. By giving K a value of "−1", the polarization of the transmitted signal will be linear polarization in which both the X and Y transmitted with an opposite sign. By giving K an imaginary value of "j", the polarization of the transmitted signal is left hand polarized. By giving K an imaginary value of "−j", the polarization of the transmitted signal is right hand polarized.

Accordingly, the changes in polarization of the overall signal may serve as a third code, with the diversity circular polarization modulation ("DCPM") navigational code defined as an aggregate of the in-phase value C1 transmitting the code PN_1, the quadrature value C2 transmitting the code PN_2, and the third code PN_3 being transmitted through the polarization sense of the transmitted signal. In other words, the series of values comprising "K" are the third PN code, PN_3.

As illustrated in FIG. 12, the code C1, PN code PN_1, and code C2, PN code PN_2 are fed to circular polarization phase shift controller 1202. The circular polarization phase shift controller is controlled by phase shift control code K, which serves as PN_3. The outputs from the circular polarization shift controller 1202 are provided to quadrature up converters which up-convert the baseband signals to the Radio Frequency ("RF") carrier signal 1208 to form modulated RF signals 1210 and 1212. The modulated RF signals 1210 and 1212 are amplified by amplifiers 1214 and 1216, respectively, and transmitted by crossed dipole radiating elements 1218 and 1220, respectively.

Transmitter 1200 may also be configured to transmit PN codes with polarization hopping, as described above with reference to FIG. 1 or FIG. 3. In such an example embodiment, K is the pseudo random value that switches the polarization sense of the transmitter between, for example, right and left hand polarization. While this value is described above in, for example, FIG. 1 as a binary code that hops the signal between left and right hand polarization, FIG. 12 illustrates how the code may have four values (1, −1, j, −j) that hop the signal between two orthogonal linear polarizations, left hand circular or elliptical polarization and right hand circular or elliptical polarization.

Figure 13C:
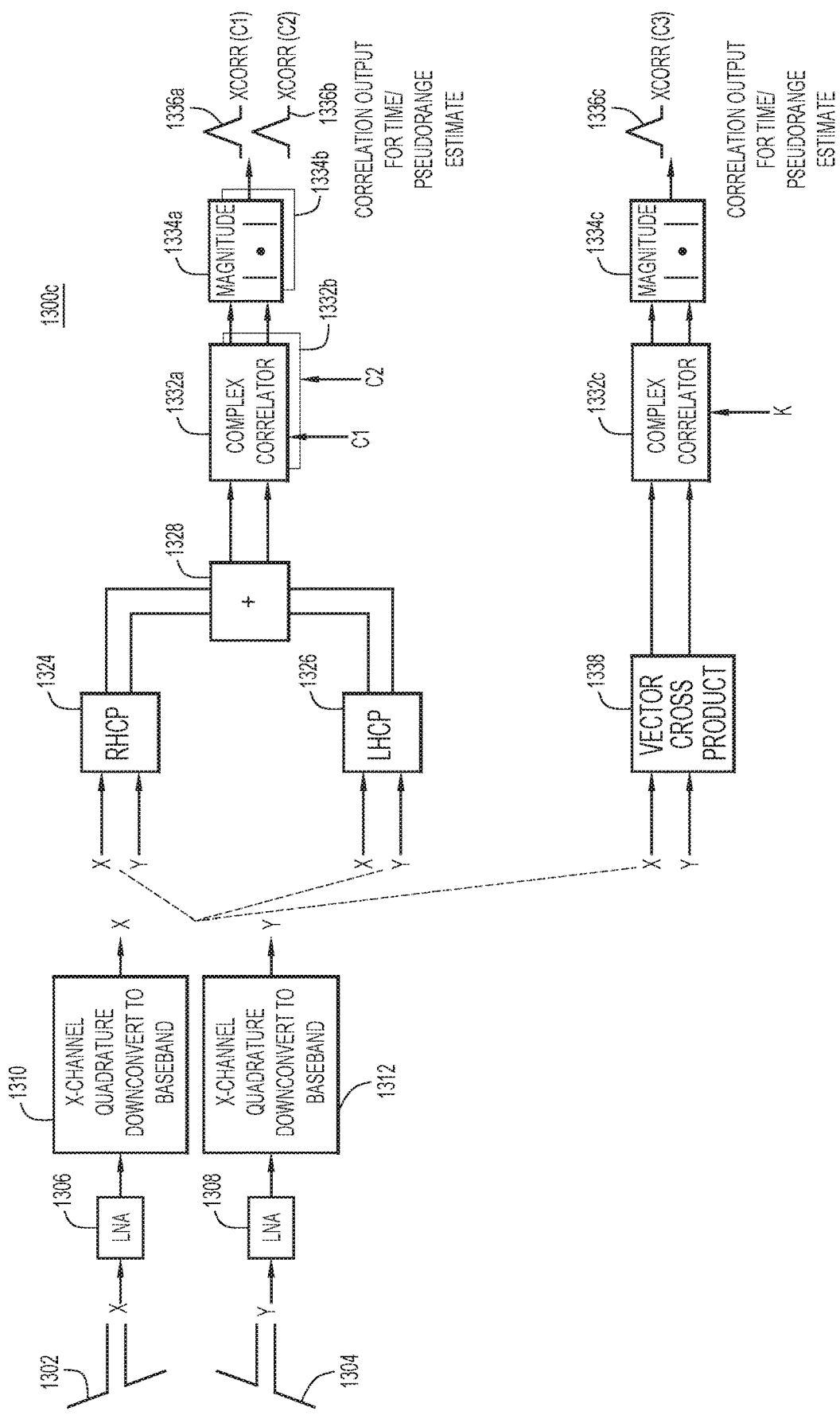

With reference now made to FIG. 13A-C, depicted in FIG. 13A is a receiver 1300a which may decode a polarization hopped signal received from a transmitter, such as transmitter 1200 of FIG. 12A. According to the example of FIG. 13A, the receiver is aware of the value K from FIG. 12A as the phase shift control code of a polarization hopping embodiment. As illustrated, signals received from the "X" and "Y" oriented antenna elements 1302 and 1304, respectively, of a crossed dipole antenna are amplified by low noise amplifiers 1306 and 1308, respectively. The signals from the from the "X" and "Y" oriented antenna elements 1302 and 1304, respectively, are then downconverted to baseband by downconverters 1310 and 1312, respectively. The amplified and demodulated signal from the "X" element of the crossed dipole antenna is fed to combiner 1314, while the signal received from the "Y" element 1304 undergoes phase shifting, from phase shifter 1316 and 1318, with the phase shift provided by phase shifter 1318 being controlled by the value of K, essentially "undoing" the phase shift implemented by the value K in FIG. 12. The phase shifted signal from the "Y" element is then fed to the combiner 1314. The combiner output consisting of the sum of the phase shifted "Y" signal, and the un-shifted "X" signal, are fed to the complex correlator 1320. The complex correlator correlates the combiner output with local values for the first and second navigational codes representing by values C1 and C2. The real part of the local code C1 is PN_1 and the imaginary part of the local code C2 is PN_2. The magnitude 1322 of the correlator output is the correlation peak used for detection and ranging measurement, for this aggregate code.

Depicted in FIG. 13C is a receiver 1300c configured to decode three navigational codes, a code C1 transmitted with right hand circular polarization sense, a code C2 transmitted with left hand circular polarization sense, and a third code sent via the polarization sense of the overall combined signal used to transmit codes C1 and C2. In other words, receiver 1300c is configured to decode a signal sent from the three-code embodiment described above with reference to FIG. 12A.

The processing performed by receiver 1300*c* begins like that of receiver 1300*a* of FIG. 13A with signals received from the "X" and "Y" oriented antenna elements 1302 and 1304, respectively, of a crossed dipole antenna are amplified by low noise amplifiers 1306 and 1308, respectively. The signals from the "X" and "Y" oriented antenna elements 1302 and 1304, respectively, are then downconverted to baseband by downconverters 1310 and 1312, respectively.

Unlike FIG. 13A, the outputs of downconverters 1310 and 1312 are fed to right hand circular polarization processing 1324 and left hand circular polarization processing 1326, which correspond to the processing illustrated in right hand circular polarization processing and left hand circular polarization processing of FIG. 11. The outputs of each of the right hand circular polarization processing 1324 and the left hand circular polarization processing 1326 are fed to combiner 1328, which serves an analogous function to combiners 1110 and 1112 of FIG. 11. Complex correlators 1332*a* and 1332*b* correlate the combiner output with local values for the first and second navigational codes represented by values C1 and C2. The magnitudes 1334*a* and 1334*b* of the correlator outputs are the correlation peaks used for detection and ranging measurement, for codes C1 and C2.

To process the third code corresponding to K from transmitter 1200 of FIG. 12A, the outputs of downconverters 1310 and 1312 are also fed to vector cross product calculator 1338. The value of the vector cross product of the output of downconverters 1310 and 1312 will change sign with changes in polarization sense of the overall transmitted signal. Accordingly, the sign of the output of vector cross product calculator 1338 will change with the value of K. Complex correlator 1332*c* can correlate these changes in sign with K. The magnitude 1334*c* of the correlator output is the correlation peak used for detection and ranging measurement for the code corresponding to K.

Figures 14A, 14B:
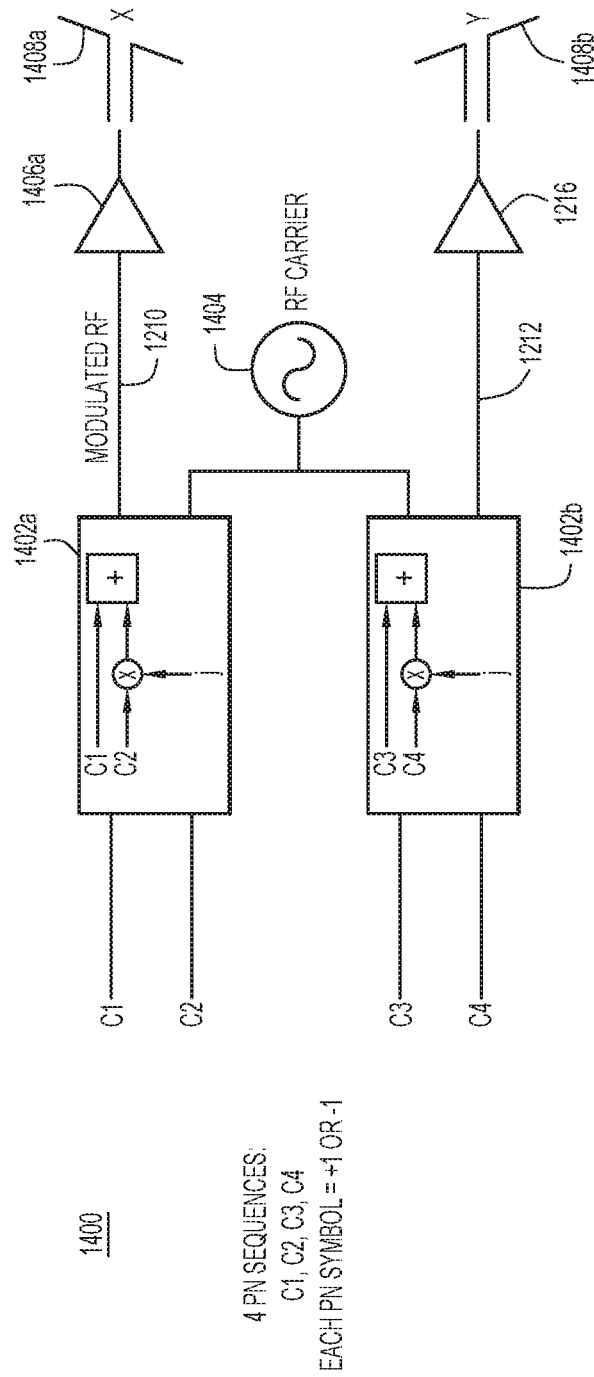
FIGS. 14A and 14B are a block diagram of a transmitter configured to transmit four pseudo-noise codes using diversity polarization, and a chart indicating the polarization of the output electromagnetic radiation, respectively, according to an example embodiment.

With reference now made to FIGS. 14A and 14B, depicted therein is a transmitter 1400 that generalizes the polarization diversity transmission techniques described herein. Specifically, illustrated in FIG. 14A is a transmitter 1400 that is configured to transmit four PN code sequences C1, C2, C3 and C4 which will be received at a receiver and decoded using correlation at the receiver. Each of these values may be either a positive 1 or negative 1 value over a symbol period, and based on the values of C1, C2, C3 and C4, the polarization output from the crossed dipole antennas will be as illustrated in FIG. 14B.

The transmitter 1400 also simplifies to the polarization hopping example as illustrated in, for example, FIGS. 3 and/or 12, if constraints are placed on the values of C1, C2, C3 and C4 as illustrated in, for example, FIGS. 3 and 12. Transmitter 1400 similarly simplifies to transmitter 1200 of FIG. 12A by placing other constraints on the values of C1, C2, C3 and C4, such that the phase shift between the values controls the polarization sense such that a third PN code is sent via the changes in polarization sense.

Specifically, codes C1 and C2 are provided to baseband upconverter 1402*a* in which C2 is phase shifted relative to C1, the signals are combined and are upconverted to carrier signal 1404, which in this case is a radio frequency (RF) carrier signal. The modulated radio frequency signal is amplified by amplifier 1406*a* and transmitted via the X element 1408*a* of a crossed dipole antenna. Codes C3 and C4 are provided to baseband upconverter 1402*b* in which C4 is phase shifted relative to C3, the signals are combined and are upconverted to RF carrier signal 1404. The modulated radio frequency signal is amplified by amplifier 1406*b* and transmitted via the Y element 1408*b* of the crossed dipole antenna.

FIG. 14B illustrates the overall polarization of the signal output from the crossed dipole antenna as dependent on the values of C1, C2, C3 and C4.

With reference now made to FIGS. 15A and 15B, depicted therein is a general receiver 1500 configured to receive and demodulate signals received from a receiver like receiver 1400 of FIG. 14A. Specifically, signals are received over the X element 1502*a* and the Y element 1502*b* of a crossed dipole receiver antenna. These signals are downcoverted to baseband from the radio frequency carrier signal.

As illustrated, the complex baseband signals received from the X antenna element 1502*a* and Y antenna element 1502*b* are combined in combiner 1504 after the Y element signal is phase shifted by the inverse of K. K is known at the receiver 1500 based upon the local values of C1, C2, C3 and C4 known by the receiver 1500, as illustrated in FIG. 15B. The local codes C1 and C2 are correlated with the output of combiner 1504 from the X element 1502*a* in complex correlator 1508*a*. Similarly the local codes C3 and C4 are correlated with the output of combiner 1504 from Y element 1502*b* in complex correlator 1508*b*. Because the output of Y element 1502*b* was multiplied by the inverse of K, the local versions of C3 and C4 are similarly multiplied by the inverse of K in operation 1509. The magnitudes 1510*a* and 1510*b* of the correlator outputs are the correlation peaks used for detection and ranging measurement, for codes C1, C2, C3 and C4, respectively.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    transmitting a digital code that comprises a pseudo-random code from a transmitter to a receiver;
    transmitting information including a first navigational code and a second navigational code via electromagnetic waves from the transmitter to the receiver, wherein transmitting the information comprises:
        transmitting the first navigational code using electromagnetic waves with a first polarization in response to a first value of the digital code; and
        transmitting the second navigational code using electromagnetic waves of a second polarization in response to a second value of the digital code,
    wherein the transmitting the first navigational code and the transmitting the second navigational code result in polarization hopping of the first polarization and the second polarization between different types of polarization over time according to a random pattern of the pseudo-random code.

2. The method of claim 1, wherein the first navigational code and the second navigational code are transmitted consecutively in time.

3. The method of claim 1, wherein:
    the first polarization comprises one of right hand circular polarization, left hand circular polarization, right hand elliptical polarization, left hand elliptical polarization, and/or linear polarization; and
    the second polarization comprises another of right hand circular polarization, left hand circular polarization, right hand elliptical polarization, left hand elliptical polarization, and/or linear polarization.

4. The method of claim 1, wherein transmitting the digital code from the transmitter to the receiver comprises transmitting the digital code encrypted with an encryption key known to the receiver.

5. The method of claim 1, wherein transmitting the information comprises transmitting the information using a crossed dipole antenna.

6. The method of claim 1, wherein transmitting the first navigational code comprises transmitting the first navigational code with a first helical antenna providing right hand circular polarized electromagnetic waves; and
wherein transmitting the second navigational code comprises transmitting the second navigational code with a second helical antenna providing left hand circular polarized electromagnetic waves.

7. The method of claim 1, wherein transmitting the first navigational code and transmitting the second navigational code comprises transmitting the first navigational code and the second navigational code at the same time as a combined linearly polarized signal.

8. A method comprising:
receiving, at a receiver from a transmitter, a digital code comprising a pseudo-random code;
receiving, at the receiver, first electromagnetic waves;
decoding, using correlation, a first navigational code from the first electromagnetic waves corresponding to a first polarization in response to a first value of the digital code, wherein the first polarization includes polarization hopping between different types of the first polarization over time according to a random pattern of the pseudo-random code, and the decoding includes determining the different types of the first polarization using the pseudo-random code;
receiving, at the receiver, second electromagnetic waves; and
decoding, using correlation, a second navigational code from the second electromagnetic waves corresponding to a second polarization in response to a second value of the digital code, wherein the second polarization includes polarization hopping between different types of second polarization over time according to the random pattern of the pseudo-random code, and the decoding the second navigational code includes determining the different types of second polarization using the pseudo-random code.

9. The method of claim 8, wherein the first polarization comprises one of right hand circular polarization, left hand circular polarization, right hand elliptical polarization, left hand elliptical polarization, and/or linear polarization; and
the second polarization comprises another of right hand circular polarization, left hand circular polarization, right hand elliptical polarization, left hand elliptical polarization, and/or linear polarization.

10. The method of claim 8, wherein receiving the digital code comprises receiving an encrypted code; and
further comprising decrypting the encrypted code with an encryption key stored at the receiver.

11. The method of claim 8, wherein the first polarization comprises right hand circular polarization; and
wherein the second polarization comprises left hand circular polarization.

12. The method of claim 11, further comprising determining a total power measurement of the first electromagnetic waves combined with the second electromagnetic waves; and determining that a jammer signal is included in at least one of the first electromagnetic waves and/or the second electromagnetic waves in response to the total power measurement exceeding a predetermined threshold.

13. The method of claim 12, further comprising:
making a power measurement of a right hand circular polarized portion of the first and second electromagnetic waves;
making a power measurement of a left hand circular polarized portion of the first and second electromagnetic waves;
comparing the power measurement of the right hand circular polarized portion and the power measurement of the left hand circular polarized portion; and
determining a polarization of the jammer signal in response to the comparing of the power measurement of the right hand circular polarized portion and the power measurement of the left hand circular polarized portion.

14. The method of claim 13, further comprising providing anti jamming processing in response to determining the polarization of the jamming signal.

15. A method comprising
encoding a first signal of a first channel of a transmitter with a first navigational code;
encoding a second signal of the first channel of the transmitter with a second navigational code;
encoding a first signal of a second channel of the transmitter with the first navigational code;
encoding a second signal of the second channel of the transmitter with the second navigational code;
phase shifting the first signal of the first channel by 90 degrees relative to the first signal of the second channel;
phase shifting the second signal of the second channel by 90 degrees relative to the second signal of the first channel;
combining the first signal of the first channel with the second signal of the first channel to generate a first channel combined signal;
combining the first signal of the second channel with the second signal of the second channel to generate a second channel combined signal; and
transmitting the first channel combined signal and the second channel combined signal such that the first signal is transmitted with right hand elliptical polarization and the second signal is transmitted with left hand elliptical polarization.

16. The method of claim 15, wherein transmitting the first channel combined signal and the second channel combined signal comprises transmitting the first signal with right hand circular polarization and the second signal with left hand circular polarization.

17. The method of claim 16, wherein transmitting the first channel combined signal comprises transmitting the first channel combined signal via a first radiating element of a crossed dipole antenna; and
wherein transmitting the second channel combined signal comprises transmitting the second channel combined signal via a second radiating element of the crossed dipole antenna.

18. The method of claim 15, wherein the first channel combined signal and the second channel combined signal are configured to be decoded at a receiver using correlation.

* * * * *